United States Patent
Matsumoto et al.

(10) Patent No.: US 6,425,522 B1
(45) Date of Patent: Jul. 30, 2002

(54) IC CARD INFORMATION PROCESSING SYSTEM, AND APPARATUS AND CARDS FOR THE SAME

(75) Inventors: Kenji Matsumoto, Yokohama; Shigeyuki Itoh, Zushi; Yutaka Takami, Yokohama; Masayuki Inoue, Fujisawa; Koichi Yoneta, Yokohama; Tetsuharu Inamitsu, Chigasaki; Yoshiisa Inoue, Hiratsuka, all of (JP)

(73) Assignees: Hitachi, Ltd., Tokyo; Hitachi Video & Information System, Inc., Yokohama, both of (JP)

( * ) Notice: Subject to any disclaimer, the term of this patent is extended or adjusted under 35 U.S.C. 154(b) by 0 days.

(21) Appl. No.: 09/356,444

(22) Filed: Jul. 19, 1999

(30) Foreign Application Priority Data

Jul. 23, 1998 (JP) .......................... 10-208289

(51) Int. Cl.[7] ............................... G06K 5/00
(52) U.S. Cl. ..................... 235/380; 235/492
(58) Field of Search ............... 235/380, 375, 235/382, 492, 441, 486, 487, 383, 384; 705/14, 10, 16, 41

(56) References Cited

U.S. PATENT DOCUMENTS

| | | | | |
|---|---|---|---|---|
| 5,530,232 A | * | 6/1996 | Taylor | 235/380 |
| 5,677,955 A | * | 10/1997 | Doggett et al. | 380/24 |
| 5,682,027 A | * | 10/1997 | Bertina et al. | 235/380 |
| 5,705,798 A | * | 1/1998 | Tarbox | 235/379 |
| 5,729,697 A | * | 3/1998 | Schkolnick et al. | 235/383 |
| 5,739,512 A | * | 4/1998 | Tognazzini | 235/380 |
| 5,742,845 A | * | 4/1998 | Wagner | 710/11 |
| 5,753,899 A | * | 5/1998 | Gomm et al. | 235/381 |
| 5,821,512 A | * | 10/1998 | O'Hagan et al. | 235/383 |
| 5,878,138 A | * | 3/1999 | Yacobi | 705/41 |
| 5,910,987 A | * | 6/1999 | Ginter et al. | 380/24 |
| 5,918,211 A | * | 6/1999 | Sloane | 705/16 |
| 6,026,370 A | * | 2/2000 | Jermyn | 705/14 |
| 6,070,148 A | * | 5/2000 | Mori et al. | 705/26 |
| 6,123,259 A | * | 9/2000 | Ogasawara | 235/380 |
| 2001/0006195 A1 | * | 7/2001 | Sukeda et al. | 235/492 |

* cited by examiner

Primary Examiner—Thien M. Le
(74) Attorney, Agent, or Firm—Antonelli, Terry, Stout & Kraus, LLP

(57) ABSTRACT

A processing apparatus for processing information contained in an IC card. When an application is newly registered in the IC card, registration of a corresponding service application program in the processing apparatus is required. Further, when applications stored in the IC card differ from those stored in the processing apparatus, a method of displaying names of the applications in a uniformized manner is required. For coping with these cases, an IC card read/write unit of the processing apparatus is made use of for registering service application programs in a memory incorporated in the processing apparatus, while the application names are registered in a memory area of the IC card in a common character code for allowing the names of the applications registered in the IC card to be displayed whenever occasion requires.

32 Claims, 23 Drawing Sheets

| NAMES OF APPLICATIONS | NAMES OF IC CARD APPLICATION PROGRAMS | NAMES OF SERVICE APPLICATION PROGRAMS |
|---|---|---|
| APPLICATION A (ELECTORONIC MONEY) | A | AA |
| APPLICATION B (CREDIT) | B | BB |
| APPLICATION C (POINT) | C | CC |
| APPLICATION D (MILEAGE) | D | DD |

| AID | NAMES OF APPLICATIONS |
|---|---|
| ABCD111111111111 | (APPLICATION A) |
| ABCD222222222222 | (APPLICATION B) |
| ABCD333333333333 | (APPLICATION C) |
| ABCD444444444444 | (APPLICATION D) |

FIG. 14
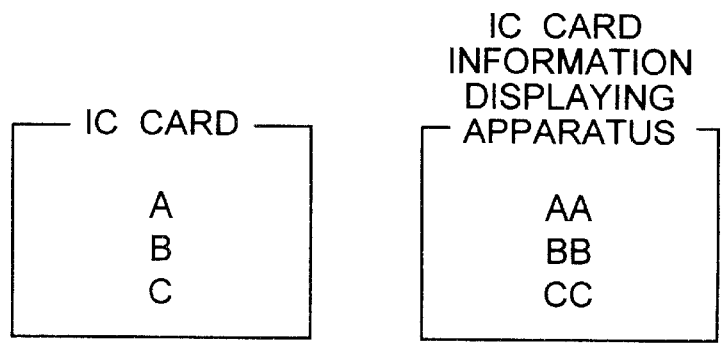
(1)
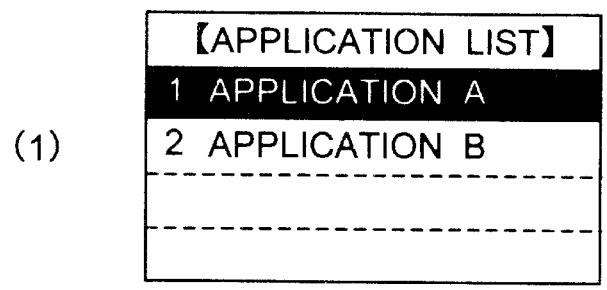
(2)
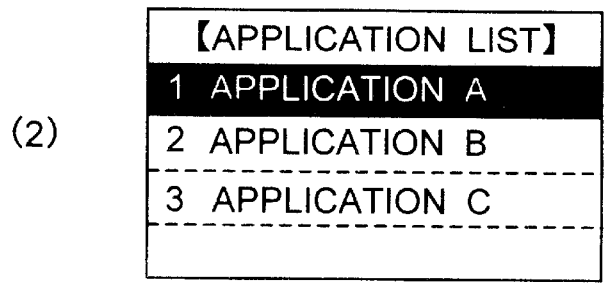
(3)
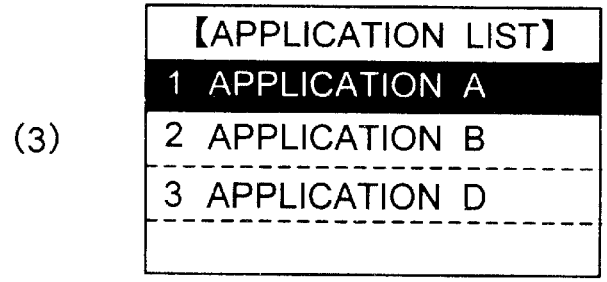
(4)
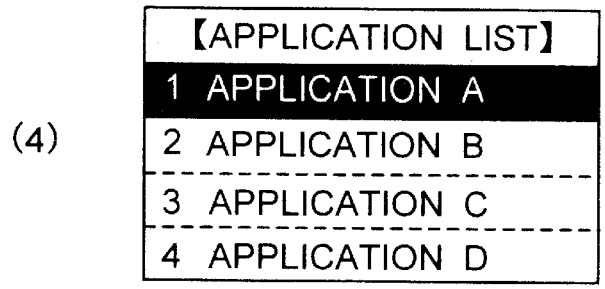

FIG. 17A

"READ DIR RECORD" COMMAND

| CLA | INS | P1 | P2 | Lc | Le |
|-----|-----|----|----|----|----|
| 00  | B2  | x1 | 04 | -  | x2 | x1: RECORD NUMBER
x2: Le LENGTH

FIG. 17B

"READ DIR RECORD" RESPONSE

LE DATA

| TAG | LENGTH | RECORDS |
|-----|--------|---------|
| 61  | (x2-2) Byte | - |
| 4F  | 1-16 Byte | AID |
| :   | :      | :       |
| 50  | 0-16 Byte | NAME OF APPLICATION |

FIG. 17C

STATUS

| SW1 | SW2 |
|-----|-----|
| s1  | s2  | s1: SW1
s2: SW2

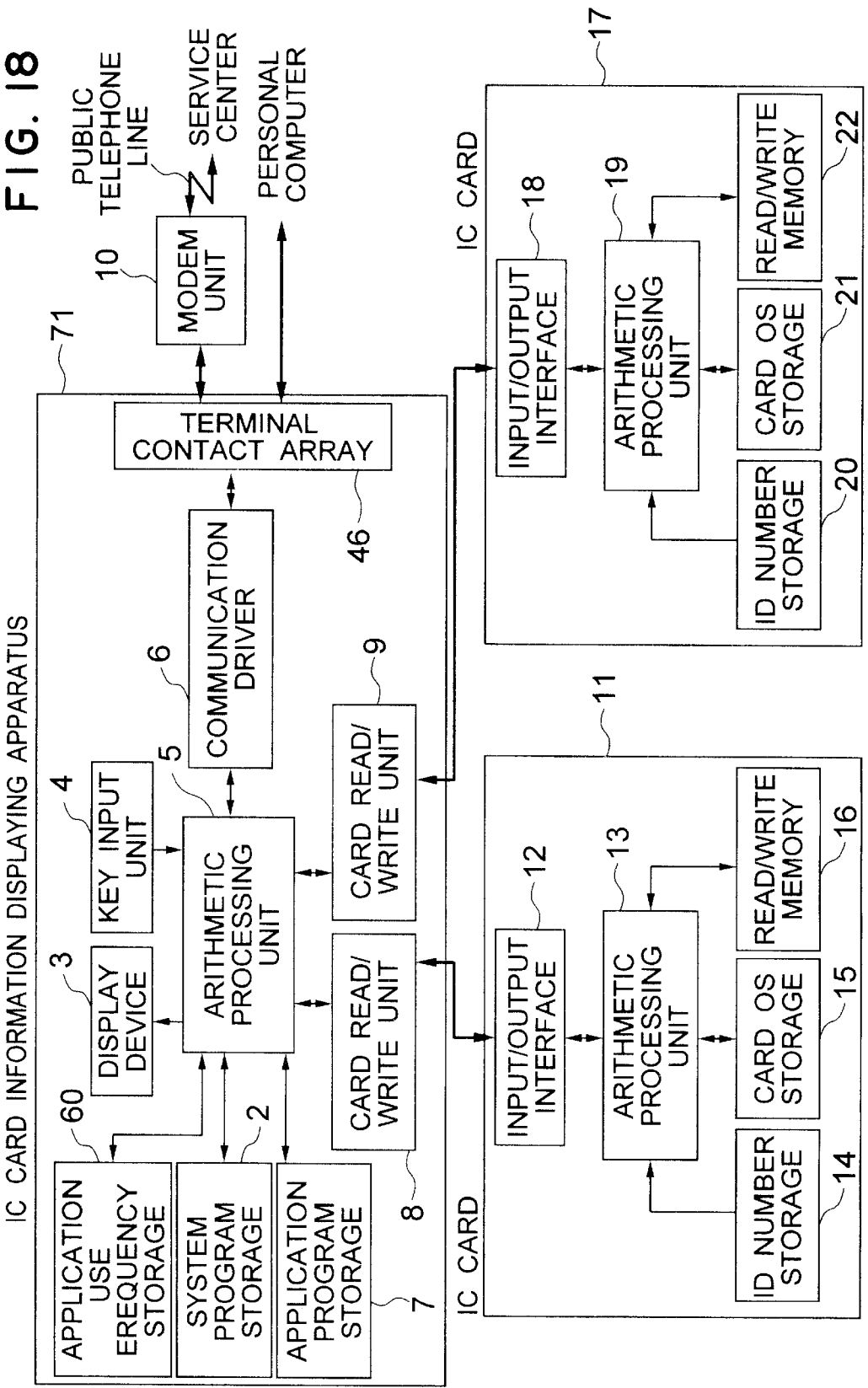

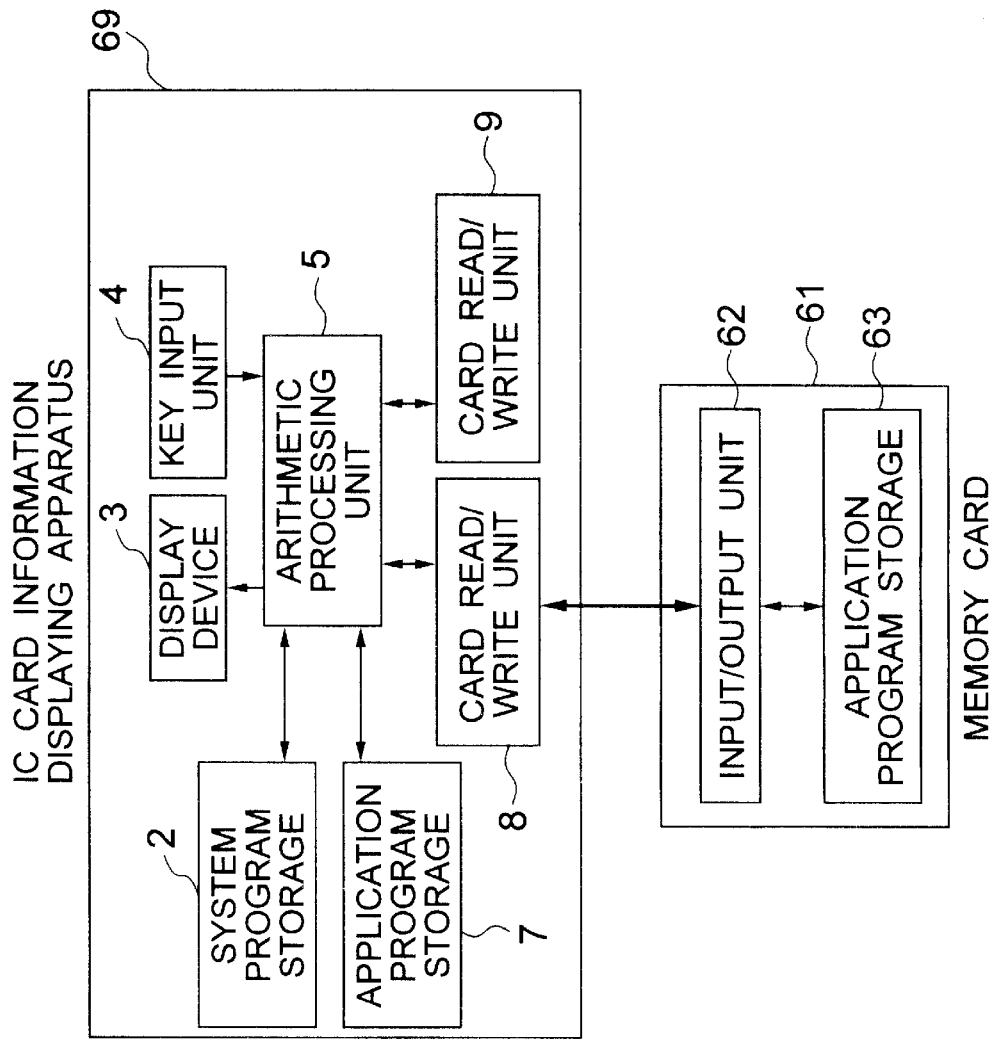

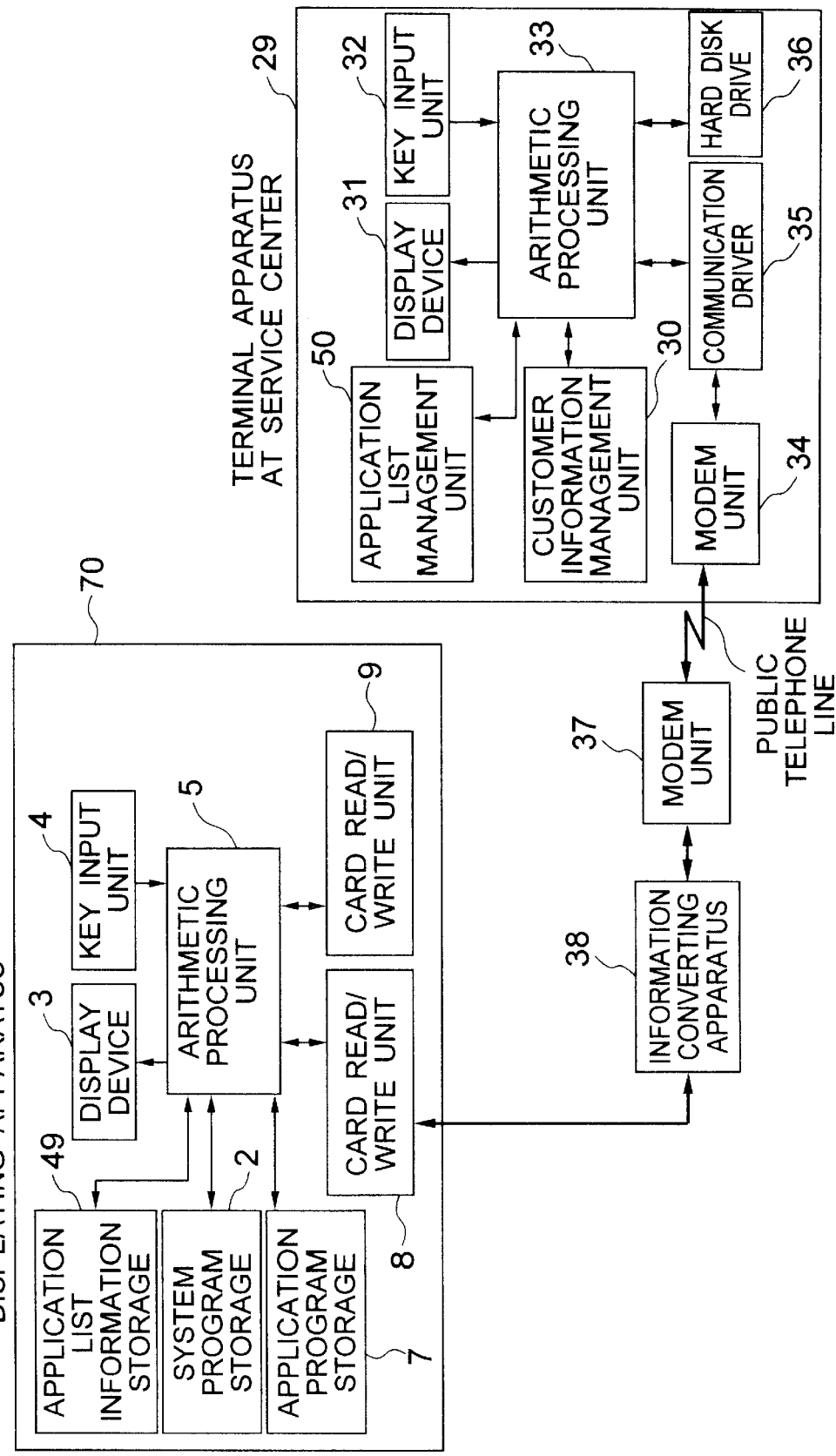

IC CARD INFORMATION PROCESSING SYSTEM, AND APPARATUS AND CARDS FOR THE SAME

BACKGROUND OF THE INVENTION

The present invention relates to an IC (integrated-circuit) card information processing system such as an IC card information displaying system for processing and/or displaying the information carried by an IC card as well as apparatuses and IC cards employed in the same.

At present, a so-called premium point service is gaining more and more popularity. In this service, a point card is widely used which is issued, for example, by an owner of a store or chain stores or the like for the customers and is designed to store data of score or point which is incremented on a purchase-by-purchase basis so that the customer can enjoy later a prize, bonus, coupon or discount equivalent to the accumulated monetary value indicated by the point data recorded in the card.

On the other hand, an electronic wallet system in which IC cards are used for commercial transactions of merchandises, commodities and the like, i.e., cashless transaction system, so to say, is being studied, as is disclosed in Japanese Unexamined Patent Application Publication No. 92966/1991 (JP-A-3-92966). In this system, information or data representing a predetermined monetary amount is stored previously in a memory incorporated in the IC card, and upon settlement of a commercial transaction or trade, information of the monetary amount involved in the transaction is transferred to the dealer. Thus, the commercial transaction or trade can be completed without using cashes.

SUMMARY OF THE INVENTION

When the electronic wallet system mentioned above is actually realized for the commercial transactions, there can be stored in the IC card not only the electronic money information but also other various application data. By way of example, the premium point information mentioned previously can equally be stored in the IC card so that the point information can be processed to be displayed together with the electronic money information on a display device of the IC card information processing apparatus.

By the way, the premium point service is generally provided for the particular customers or users who purchase merchandises or goods at high frequency. In the present state of the art, the premium point service is carried out by using a magnetic card or the like issued on a store-by-store basis. In that case, there may arise such situation in which the user has to carry a plurality of point cards which differ from one to another store. Similarly, a plurality of dedicated card information processing apparatuses have to be provided for reading and processing the information contained in the different types of magnetic point cards. By contrast, when the IC card can be used, it is possible to store a plurality of different application data in a single IC card. Besides, these application data can be displayed by one and the same IC card information processing/displaying apparatus.

In such IC card information processing system, when a different type of application data is newly registered or stored in the IC card by the user, it becomes necessary to load additionally a corresponding application program for the display control in the IC card information processing/displaying apparatus. If otherwise, the data additionally stored in the IC card can not be displayed with the IC card information processing/displaying apparatus. In this conjunction, the application program which is installed in the IC card information processing/displaying apparatus will be referred to as the service application program only for convenience of the description. Since in the IC card information processing system mentioned above, information or data which undergoes processing, as typified by the monetary amount information, has to be protected with high security, it is desirable to incorporate an arithmetic processing unit in the IC card as well so that relevant processings inclusive of decision processing can be executed internally of the IC card. Besides, because the capacity of the memory incorporated in the IC card is naturally limited, it will become necessary to load a corresponding service application program additionally in a flush memory or the like incorporated in the IC card information processing/displaying apparatus through appropriate facilities so that the corresponding processing can be performed internally of the processing apparatus.

Furthermore, it is required for the user to perform some manipulation for selecting an application of his or her concern from a plurality of applications. In that case, the types of application program data stored or held in the IC card can not always coincide with those of the service application programs installed in the IC card information processing/displaying apparatus. Such being the circumstances, there will be required a standardized or uniformized method or procedure for displaying titles or names of applications on the IC card information processing/displaying apparatus for allowing the selection of the application by the user. Parenthetically, with the term "application", it is contemplated to mean a type of job that lends itself to processing by an arithmetic processing unit or computer. Further, with the phrase "application program", it is intended to mean a program to be executed for processing the application.

In the light of the state of the art described above, it is an object of the present invention to provide a novel IC card information processing system which can successfully and satisfactorily cope with the problems mentioned above.

Another object of the invention is to provide an IC card processing apparatus, an IC card, an information converting apparatus which can be employed in the system mentioned above.

It is still another object of the present invention to provide an application program installing method or system for installing application program in the IC card information processing apparatus.

In view of the above and other objects which will become apparent as the description proceeds, there is provided according to an aspect of the present invention an IC card information processing apparatus for processing information stored in an IC card which includes an input/output unit for inputting/outputting information, a storage unit for storing information concerning a plurality of applications, and an arithmetic processing unit for processing the information concerning the applications. The IC card information processing apparatus is comprised of a service application program storage unit for storing a plurality of service application programs which correspond, respectively, to the applications registered in the IC card, an IC card read/write unit for reading/writing information through the medium of the input/output unit of the IC card, and an arithmetic processing unit for processing the information concerning the applications registered in the IC card by using the service application programs corresponding to the registered applications, respectively, while exchanging the information with the arithmetic processing unit of the IC card through the medium of the IC card read/write unit, wherein the IC card read/write unit is so designed as to enable the service application program to be inputted to the IC card information processing apparatus, and wherein the arithmetic processing unit of the IC card information processing apparatus is so designed as to control storage of the service application program inputted through the IC card read/write unit in the service application program storage unit.

According to another aspect of the present invention, there is provided an IC card which includes a first storage unit for storing a plurality of card application programs for enabling a plurality of applications to be operative, respectively, and a plurality of application data processed by the card application programs, a second storage unit for storing a plurality of information concerning names of the plural applications, and an arithmetic processing unit for processing the information stored in the first and second storage units, respectively, wherein the information concerning the names of the plural applications stored in the second storage unit is stored in a common form.

According to still another aspect of the present invention, there is provided an information converting apparatus which is destined for use with the IC card information processing apparatus of the structure described above and which is capable of inputting/outputting information to/from the IC card information processing apparatus. The information converting apparatus is comprised of a first input/output interface circuit, an information converting circuit connected to the input/output interface circuit, and a second input/output interface circuit connected to the information converting- circuit, wherein the first input/output interface circuit is so designed as to be connected to the IC card read/write unit, and wherein information inputted/outputted through the second input/output interface circuit and information inputted/outputted through the first input/output interface circuit are converted in respect to the type of the information such that the information can be inputted/outputted to/from the IC card information processing apparatus through the medium of the IC card read/write unit.

According to yet another aspect of the present invention, there is provided a service application program installing system which includes the IC card information processing apparatus implemented in the structure described previously, the IC card of the aforementioned structure, the information converting apparatus mentioned previously, and an information processing terminal apparatus which is connected to the IC card information processing apparatus by way of the information converting apparatus, wherein the information outputted from the information processing terminal apparatus is inputted to the IC card information processing apparatus through the information converting apparatus and the IC card read/write unit as a service application program to be stored in the service application program storage unit.

In a preferred mode for carrying out the invention, the information processing terminal apparatus may be equipped with communication facility for receiving the information supplied externally.

In another preferred mode for carrying out the invention, the information processing terminal apparatus may be implemented in the form of a computer.

According to a further aspect of the present invention, there is provided an IC card information processing apparatus for processing information stored in an IC card which includes an input/output unit for inputting/outputting information, a storage unit for storing information concerning a plurality of applications, and an arithmetic processing unit for processing the information concerning the applications. The IC card information processing apparatus is comprised of a service application program storage unit for storing a plurality of service application programs which correspond, respectively, to the applications registered in the IC card, an IC card read/write unit for reading information concerning the applications stored in the IC card through the medium of the input/output unit of the IC card, a display unit for displaying names of applications used in the IC card, and an arithmetic processing unit for performing such control that when a service application program corresponding to an application is not stored in the application program storage unit, the name of the application is displayed on the display unit on the basis of application identifying information contained in the information concerning the application as fetched through the IC card read/write unit.

In a preferred mode for carrying out the present invention, the information concerning the application stored in the storage unit of the IC card may include a card application program for enabling the application to be operative in the IC card and application data processed by the card application program.

In another preferred mode for carrying out the present invention, the IC card information processing apparatus may be so designed as to be capable of performing read/write operation on application data stored in the IC card when a service application program corresponding to a card application contained in the IC card and relevant to the application data is stored in the application program storage unit.

In still another preferred mode for carrying out the present invention, the service application program inputted through the IC card read/write unit may be the information which is stored in a storage medium equipped with an input/output unit which can be connected to the IC card read/write unit.

In yet another preferred mode for carrying out the present invention, the applications may be those for commercial transactions.

In a further preferred mode for carrying out the present invention, the IC card information processing apparatus may further include an application name storage unit for storing information concerning correspondences between the application identifying information and the names of the applications read through the IC card read/write unit. In that case, the arithmetic processing unit incorporated in the IC card information processing apparatus may be so designed as to perform such control that the names of the applications are displayed on the display unit on the basis of the information stored in the application name storage unit.

In still further preferred mode for carrying out the present invention, information concerning correspondences between the application identifying information and the names of the applications stored in the IC card may be inputted to the IC card information processing apparatus through the IC card read/write unit. In that case, the application name storage unit can store the information inputted through the IC card read/write unit.

In yet further preferred mode for carrying out the present invention, the application name storage unit may be so designed as to be capable of storing information concerning correspondences between the identifying information and the names of all the applications used in the IC card.

In yet another preferred mode for carrying out the present invention, the application identifying information read through the medium of the IC card read/write unit may contain a predetermined type of information. In that case, the arithmetic processing unit may be so designed as to perform such control that the predetermined type of information can be displayed on the display unit.

In still another preferred mode for carrying out the invention, the predetermined type of information may be character code information.

In a further preferred mode for carrying out the invention, the name of the application may be represented by one selected from a formal name, an abridged name and graphic information indicative of the application.

In a still further preferred mode for carrying out the invention, the first input/output interface circuit unit of the information converting apparatus mentioned hereinbefore may be provided with contacts for inputting/outputting the information. In that case, shape of a portion of the first input/output interface circuit unit which is connected to the IC card read/write unit as well as positions of the contacts are so selected as to be compatible with the IC card which conforms to the ISO-7816 Standards.

In a yet further preferred mode for carrying out the invention, the second input/output interface circuit of the information converting apparatus may be implemented in conformance with the RS-232C Standards.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 14 is a view for illustrating, by way of example, displays of application names in the IC card information displaying apparatus according to an embodiment of the invention;

FIGS. 17A to 17C are views for illustrating, by way of example, methods of storing application names in an IC card employed in the IC card information displaying apparatus according to an embodiment of the invention;

FIG. 18 is a block diagram showing a configuration of an IC card information displaying apparatus and a structure of IC card according to another embodiment of the present invention;

FIG. 24 is a block diagram showing a system arrangement according to an embodiment of the present invention which corresponds to that shown in FIG. 15 except that a communication driver and a terminal contact array for external connection are spared; and FIG. 25 is a block diagram showing a system arrangement according to an embodiment of the present invention which corresponds to that shown in FIG. 15 except that a communication driver and a terminal contact array for external connection are spared and that an IC card read/write unit and a modem are interconnected via an information converting apparatus.

DESCRIPTION OF THE EMBODIMENTS

Figure 1:
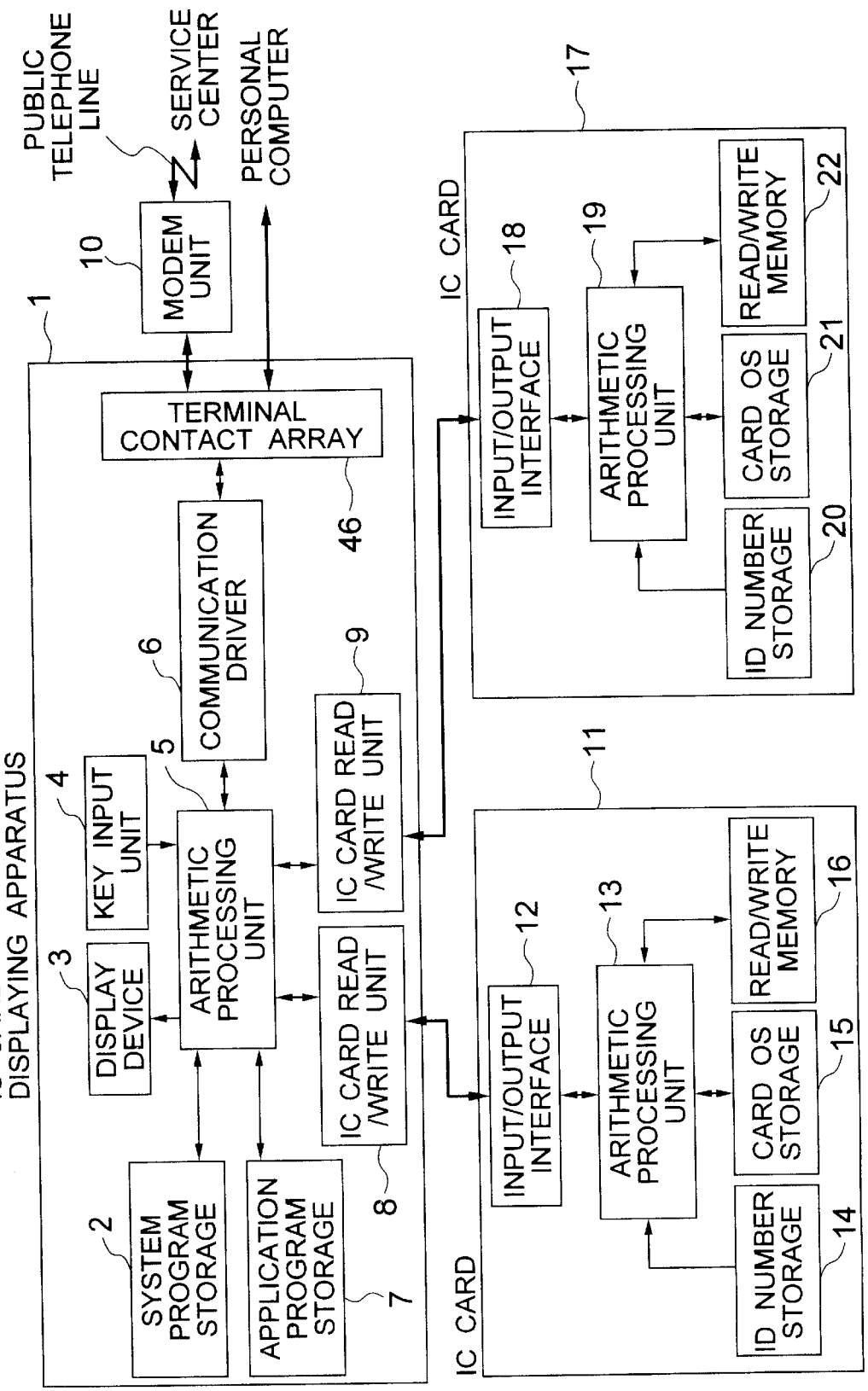
FIG. 1 is a block diagram showing a configuration of an IC card information displaying apparatus and a structure of an IC card according to an embodiment of the present invention.

The present invention will be described in detail in conjunction with what is presently considered as preferred or typical embodiments thereof by reference to FIGS. 1 to 25. In the following description, like reference characters designate like parts throughout the several views. Further, although the following description is directed to an IC card information displaying apparatus which is a typical one of the IC card information processing apparatus, it should be understood that this is only for the purpose of illustration and that the invention is never restricted to such displaying apparatus but can be applied to other various processings of numerous sorts of data stored in an IC card.

FIG. 1 shows an IC card information displaying apparatus together with IC cards according to an embodiment of the present invention. More specifically, this figure shows in a schematic block diagram a structural configuration of the IC card information displaying apparatus for displaying information concerning a plurality of applications stored in an IC card as well as a structure of the IC card. Parenthetically, the application (i.e., a type of job that lends itself to processing by an arithmetic processing unit) will be referred to as the card application.

Referring to FIG. 1, the IC card information displaying apparatus (also referred to as the display apparatus) denoted generally by reference numeral 1 is comprised of a system program storage 2, a display device 3, a key input unit 4, an arithmetic processing unit 5, a communication driver 6, an application program storage 7, IC card read/write units 8 and 9, and a terminal contact array 46 for external connection. A modem (modulation/demodulation) unit 10 is connected to the IC card information displaying apparatus 1 through the terminal contact array 46. Further, reference numerals 11 and 17 denote IC cards, respectively, wherein the IC card 11 incorporates therein an input/output interface 12 for interconnection with the IC card information displaying apparatus 1, an arithmetic processing unit 13, an ID number storage 14, an operating system storage 15 (hereinafter also referred to as the card OS storage) and a read/write memory 16. Similarly, the IC card 17 incorporates therein an input/output interface 18 for interconnection with the IC card information displaying apparatus 1, an arithmetic processing unit 19, an ID number storage 20, a card OS storage 21 and a read/write memory 22.

Figure 2:
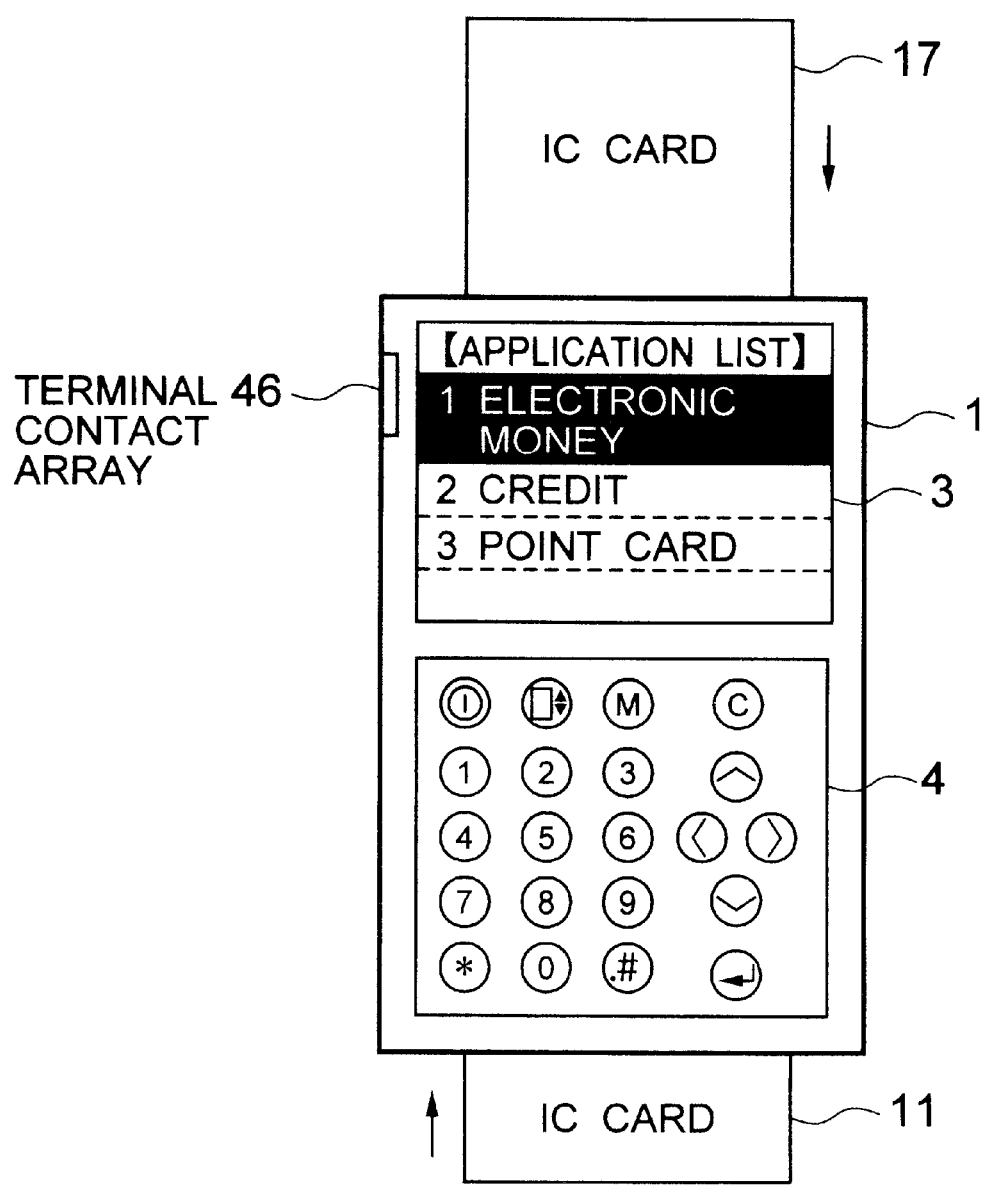
FIG. 2 is a plan view showing an outer appearance of the IC card information displaying apparatus according to an embodiment of the present invention.

In the first place, description will be made of the outer appearance feature of the IC card information displaying apparatus 1 by reference to FIG. 2. The IC card information displaying apparatus 1 is equipped with the display device 3 for displaying various data stored or contained in the IC card. To this end, the display device 3 may be constituted by a dot matrix type LCD (liquid-crystal display) for displaying characters, numerals, symbols, etc. Further, the IC card information displaying apparatus 1 includes the key input unit 4 which is used by user for selection of the application, input of numerical values and so forth. As can be seen in FIG. 2, the IC card information displaying apparatus 1 now under consideration is provided with a pair of IC card slots formed, for example, in top and bottom walls so that the user can insert two sheets of IC cards in the IC card information displaying apparatus 1. The terminal contact array 46 is provided for allowing the IC card information displaying apparatus 1 to be connected to an external personal computer or modem unit for loading or installing an application program or programs in the IC card information displaying apparatus 1.

In the case of the example illustrated in FIG. 2, a list of applications is displayed for enabling the user to select his or her concerned or desired application, wherein a given cursor row "electronic money" is displayed in inversion (black in this case). When the user pushes an enter key of the input key unit 4 in this state, the item application program corresponding to the item (electronic money) displayed in black is selected to be executed.

Turning back to FIG. 1, description will be made of the IC card 11;17. Card application programs such as for electronic money, points and the like are stored in the read/write memory 16;22 together with data intrinsic to the individual applications such as monetary amount information, point remainder information and the like. Incidentally, the read/write memory 16;22 may be constituted by an EEPROM (Electrically Erasable Programmable Read-Only Memory).

Further, the card OS storage 15;21 stores therein various OS programs for controlling the card application programs mentioned above. The card OS stored in the storage 15;21 is in charge of controlling the selection of card application, intrinsic data read/write operation, registration of new card application and erasure of existing card application. On the other hand, the ID number storage 14;20 stores therein the identification number intrinsic to the IC card. Thus, upon execution of the card application, authenticity of the IC card can be verified by making use of the identification number.

Furthermore, the IC card 11;17 incorporates therein the arithmetic processing unit 13;19. Thus, all the application data are supplied to the IC card information displaying apparatus 1 through the arithmetic processing unit 13;19 by way of the input/output interface 12;18.

Now, referring to FIG. 1, the IC card information displaying apparatus 1 will be described in detail. The service application programs such as those for the electronic money, the point or score and the like are stored in the application program storage 7. On the other hand, the system program common to the individual applications such as for the display control, key control, IC card read/write control, communication driver control and the like are stored in the system program storage 2.

At this juncture, it should be mentioned that the application program storage 7 may be constituted by a memory susceptible to data read/write/erase operation such as a flush memory so that the addition and the erasure of the service application program are made possible. Similarly, the system program storage 2 should preferably be constituted by a flush memory for enabling program version-up.

When the user desires to display the application data such as the electronic money, the point or the like, the application-intrinsic data such as the monetary amount information, point remainder information or the like is supplied from the IC card 11;17 to the IC card information displaying apparatus 1 to be processed by the arithmetic processing unit 5, the result of which is displayed on the display device 3. Thus, the user can input a succeeding command through manipulation of the key input unit 4 while observing the content displayed on the display device 3.

When a service application program and a system program is to be newly installed in the IC card information displaying apparatus 1, this can be achieved through exchange of data with an external modem unit, a personal computer or the like by way of the communication driver 6. To this end, the communication driver 6 should preferably be so designed as to generate the signal conforming to e.g. the RS-232C Standards.

At this juncture, it should be mentioned that in the case of the electronic money system, data transaction between two sheets of IC cards will be required for transferring monetary amount information therebetween. In that case, two sheets of IC cards are inserted in the IC card information displaying apparatus 1, whereby the monetary amount information stored in the read/write memory of the IC cards can be transferred directly between two sheets of IC cards. In this way, the monetary transaction can be accomplished.

Next, referring to FIGS. 3 to 10, description will be made of procedures of installing newly a service application program in the application program storage 7. In this conjunction, it should be added that the system program of the IC card information displaying apparatus 1 can equally be updated (version-up) by rewriting the contents stored in the system program storage 2 through a similar procedure.

Figure 3:
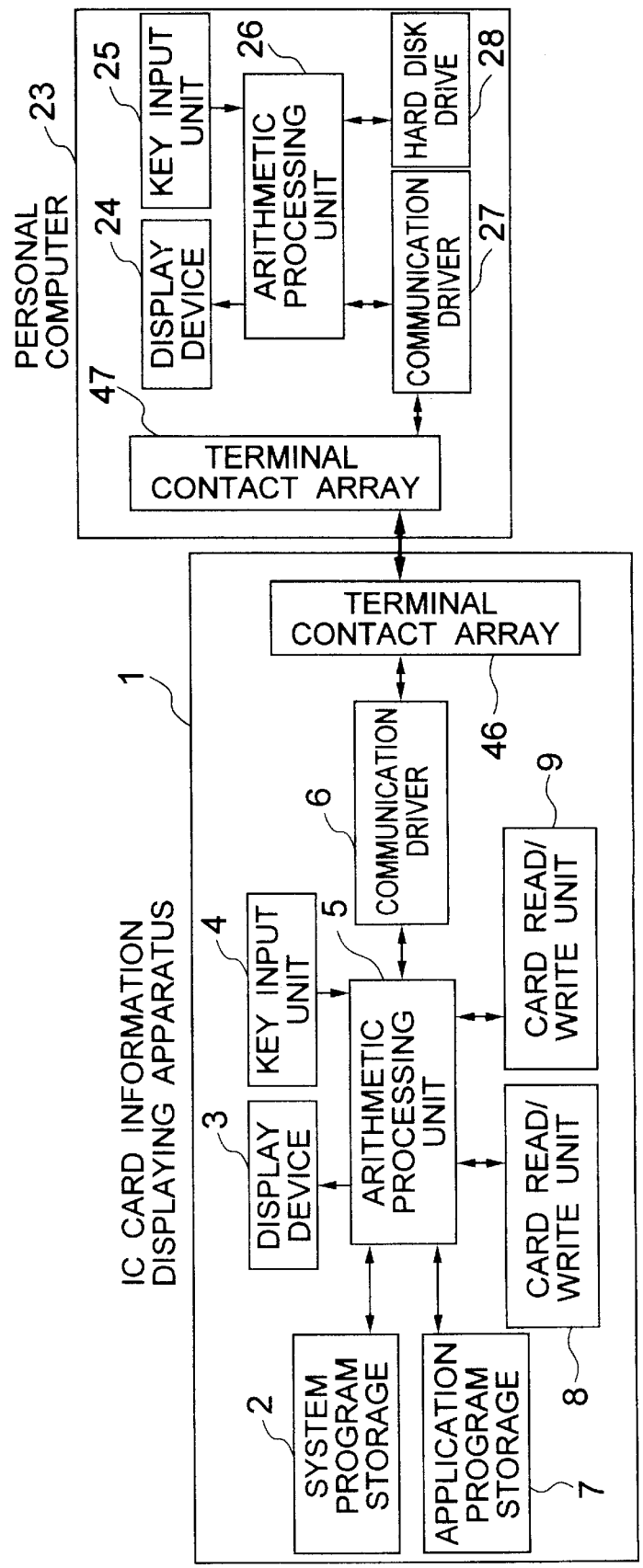
FIG. 3 is block diagram showing a system arrangement for installing a service application program in the IC card information displaying apparatus by using a personal computer according to an embodiment of the present invention.

FIG. 3 is a block diagram showing interconnection of the IC card information displaying apparatus 1 and the personal computer 23 by connecting directly the terminal contact array 46 of the former to a terminal contact array 47 of the latter by a cable for installing or loading a service application program in the IC card information displaying apparatus 1.

Referring to FIG. 3, the personal computer 23 is comprised of a display device 24, a key input unit 25, an arithmetic processing unit 26, a communication driver 27, a hard disk drive (HDD) 28 and the terminal contact array 47.

The communication driver 6;27 is designed to generate signals which conform to, for example, the RS-232C Standards. Further, interfacing between the IC card information displaying apparatus 1 and the personal computer 23 can be realized by using four signals, i.e., a send data signal, a receive data signal, a send request signal and a send enable signal. Furthermore, electric power supply can also be realized through the same interfacing. In that case, program installation can be performed without need for connecting the IC card information displaying apparatus 1 to an electric power supply such as a cell or battery, which is advantageous for installing the system program and the service application program(s) in the IC card information displaying apparatus 1 upon shipping thereof from a factory or shop. Furthermore, it is equally possible to provide the IC card information displaying apparatus 1 with a hardware switch which is so designed as to be automatically closed for changing over the operation mode of the IC card information displaying apparatus 1 to a program install mode for installing the system program or the service application program upon connection of the cable.

It is presumed that the service application program to be installed in the IC card information displaying apparatus 1 is stored in the hard disk drive 28 of the personal computer 23. Thus, when the operator or user manipulates the key input unit 25 of the personal computer 23 for selecting a desired service application program, the selected application is then installed in the IC card information displaying apparatus 1. Parenthetically, interfacing between the IC card information displaying apparatus 1 and the personal computer 23 can be realized not only through the cable interconnection mentioned above but also through a wireless communication. To this end, there may be adopted, for example, an infrared ray transmission based on the IrDA (infrared data association).

Figure 4:
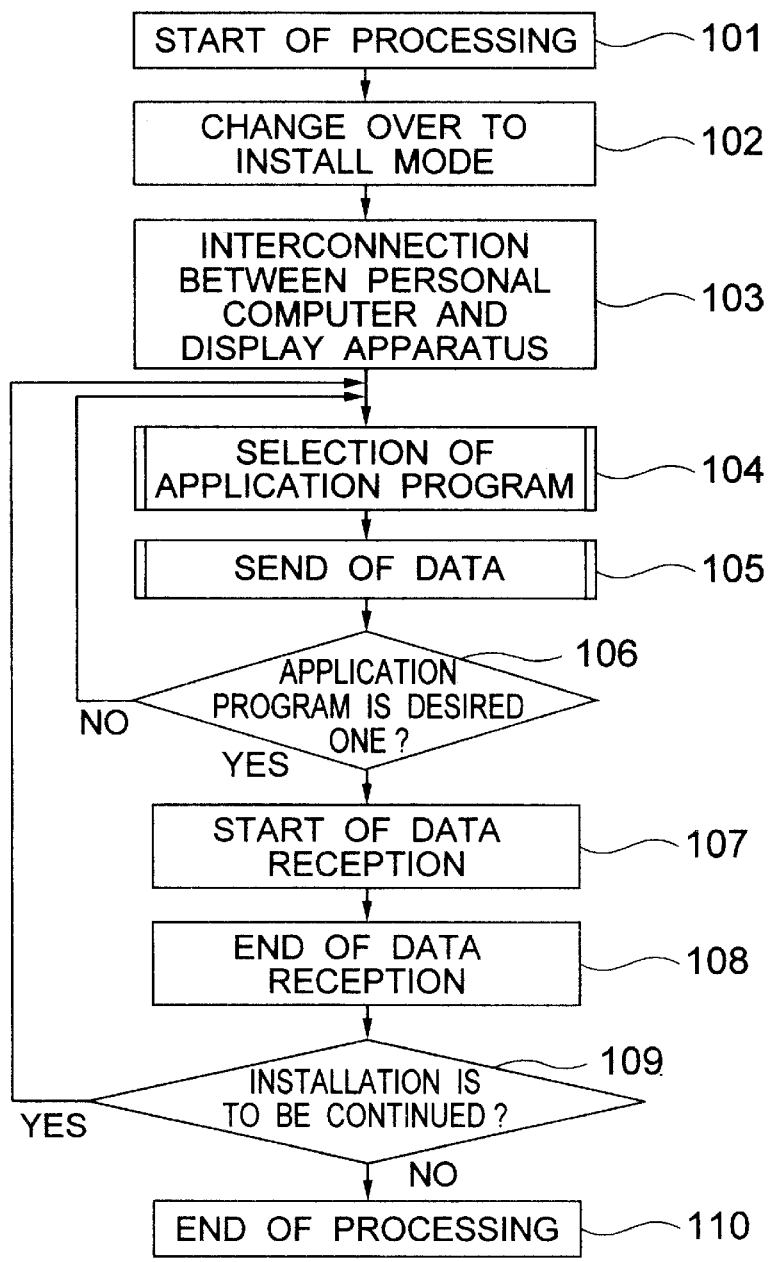
FIG. 4 is a flow chart for illustrating, by way of example, a flow of processings involved in installing a service application program with the system arrangement shown in FIG. 3.

FIG. 4 is a flow chart for illustrating a flow of processings involved in installing a service application program in the arrangement shown in FIG. 3. Referring to FIG. 4, upon power-on of the IC card information displaying apparatus 1 by the user, the IC card information displaying apparatus 1 is changed over to the mode in which the application program can be installed through manipulation of the key input unit 4 by the user (steps S101, 102). In succession, interfacing or connection is established between the IC card information displaying apparatus 1 and the personal computer 23 (step S103). Subsequently, the user selects a desired application program by manipulating the key input unit 25 of the personal computer 23 (step S104). As a result of this, information such as the name of the application program as selected, the version data and the like are sent to the IC card information displaying apparatus 1 from the personal computer 23 (step S105). Thus, the user can conform whether or not the application program is the desired one (step S106).

Thereafter, the user inputs a command for installing the application. Then, the installation of the service application program is started (step S107). When the data of the service application program has been received normally (step S108), a message inquiring whether or not the installation is to be performed in succession is displayed in the IC card information displaying apparatus 1 (step S109). When the installation is not to be continued (i.e., when the decision in the step S109 results in negation "NO"), the installing work comes to an end (step S110).

Figure 5:
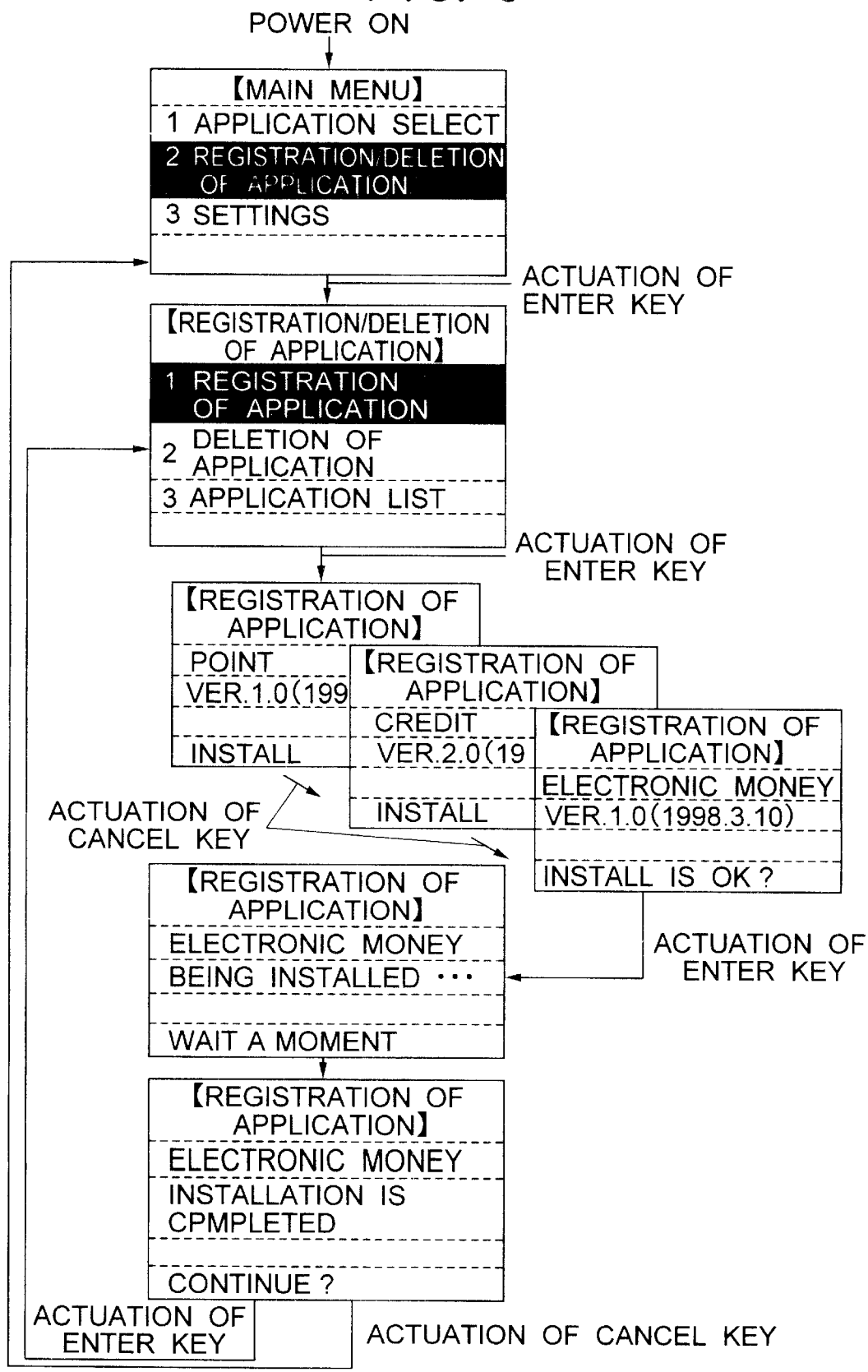
FIG. 5 is a status transition diagram for illustrating transition of display statuses on a display device of the IC card information displaying apparatus upon execution of the procedure illustrated in FIG. 4.

FIG. 5 is a status transition diagram for illustrating, by way of example only, transition of display statuses on the screen of the display device 3 of the IC card information displaying apparatus 1. As can be seen from FIG. 5, the operator can command selection of items and execution of processings sequentially from the top to the bottom in the figure by manipulating the enter key and the cancel key of the key input unit 4 through a dialogical procedure with the information (prompting) displayed on the display device 3 of the IC card information displaying apparatus 1, whereby installation of the service application program in the IC card information displaying apparatus 1 can be carried out. Incidentally, for the item selection, a scroll key may be used as occasion requires.

In the foregoing, it has been assumed that installation of the service application program is performed through the dialogical procedure with the displayed information on the display device 3 of the IC card information displaying apparatus 1. However, installation of the service application program can equally be carried through a similar dialogical procedure with the aid of information which is displayed on the display device 24 of the personal computer 23 connected to the IC card information displaying apparatus 1.

Figure 6:
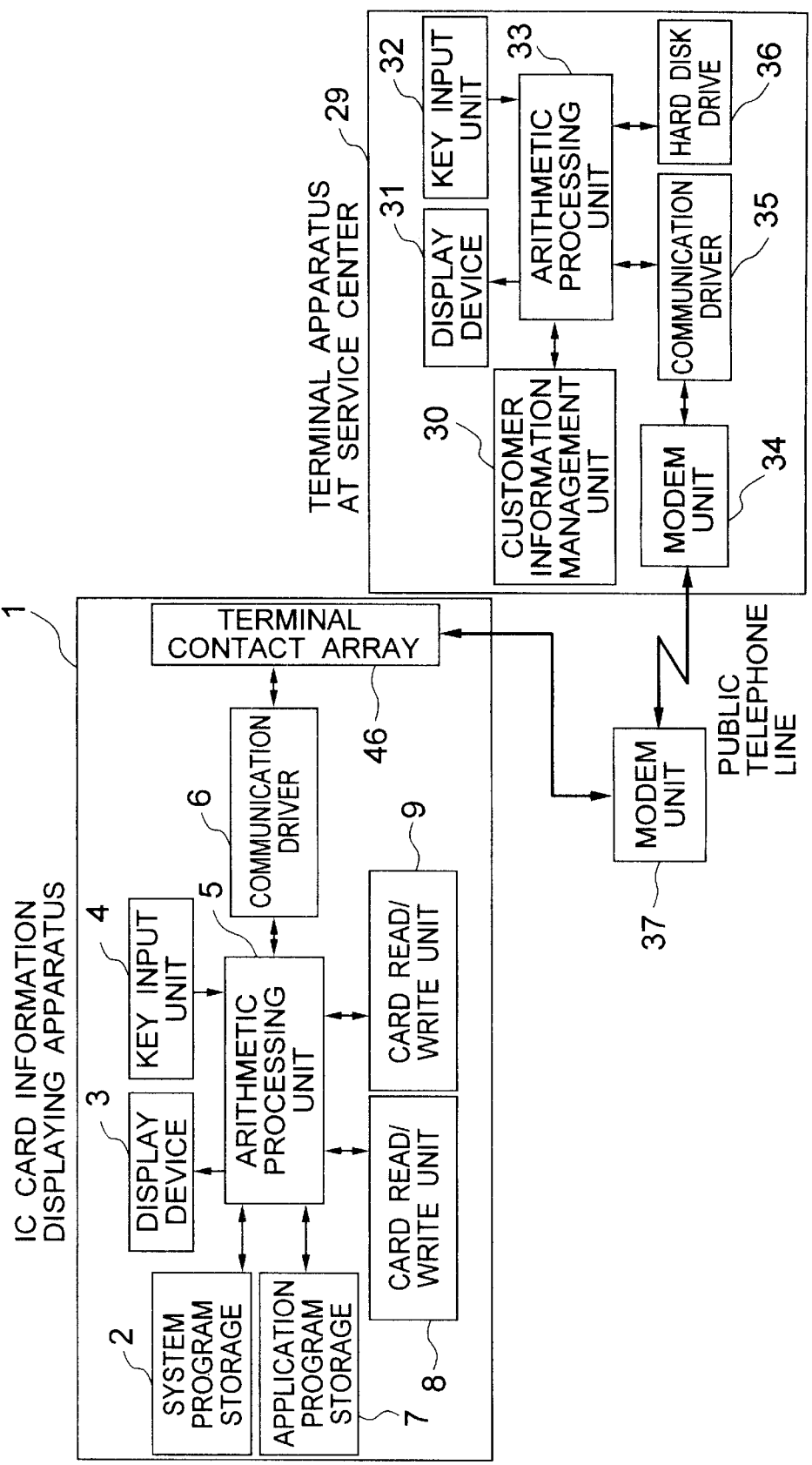
FIG. 6 is a block diagram showing a system arrangement for installing a service application program in the IC card information displaying apparatus through the medium of a modem according to an embodiment of the present invention.

FIG. 6 is a block diagram showing a system arrangement in the case where a service application program is installed through the medium of a modem unit.

In FIG. 6, reference numeral 29 denotes generally a terminal apparatus (workstation) disposed at a central service station. The terminal apparatus 29 is comprised of a customer information management unit 30, a display device 31, a key input unit 32, an arithmetic processing unit 33, a modem unit 34, a communication driver 35 and a hard disk drive (HDD) 36.

With the arrangement shown in FIG. 6, application programs and the like can be installed in the IC card information displaying apparatus from a remote place or location by way of a public telephone circuit (public communication line). In other words, for installation of a desired application program in the IC card information displaying apparatus provided at a place remote from the central service station, the user can call the central service station by telephone for requesting the central service station for down-load of the desired service application program. In this conjunction, the interface signals transferred between the communication driver 6 of the IC card information displaying apparatus and the modem unit 37 may include four signals, e.g. send data signal, receive data signal, send request signal and send enable signal. In the customer information management unit 30 of the terminal apparatus 29, there is stored a list of service application programs down-loaded in the IC card information displaying apparatuses. The list information can be referenced upon updating or version-up of the service application programs.

Figure 7:
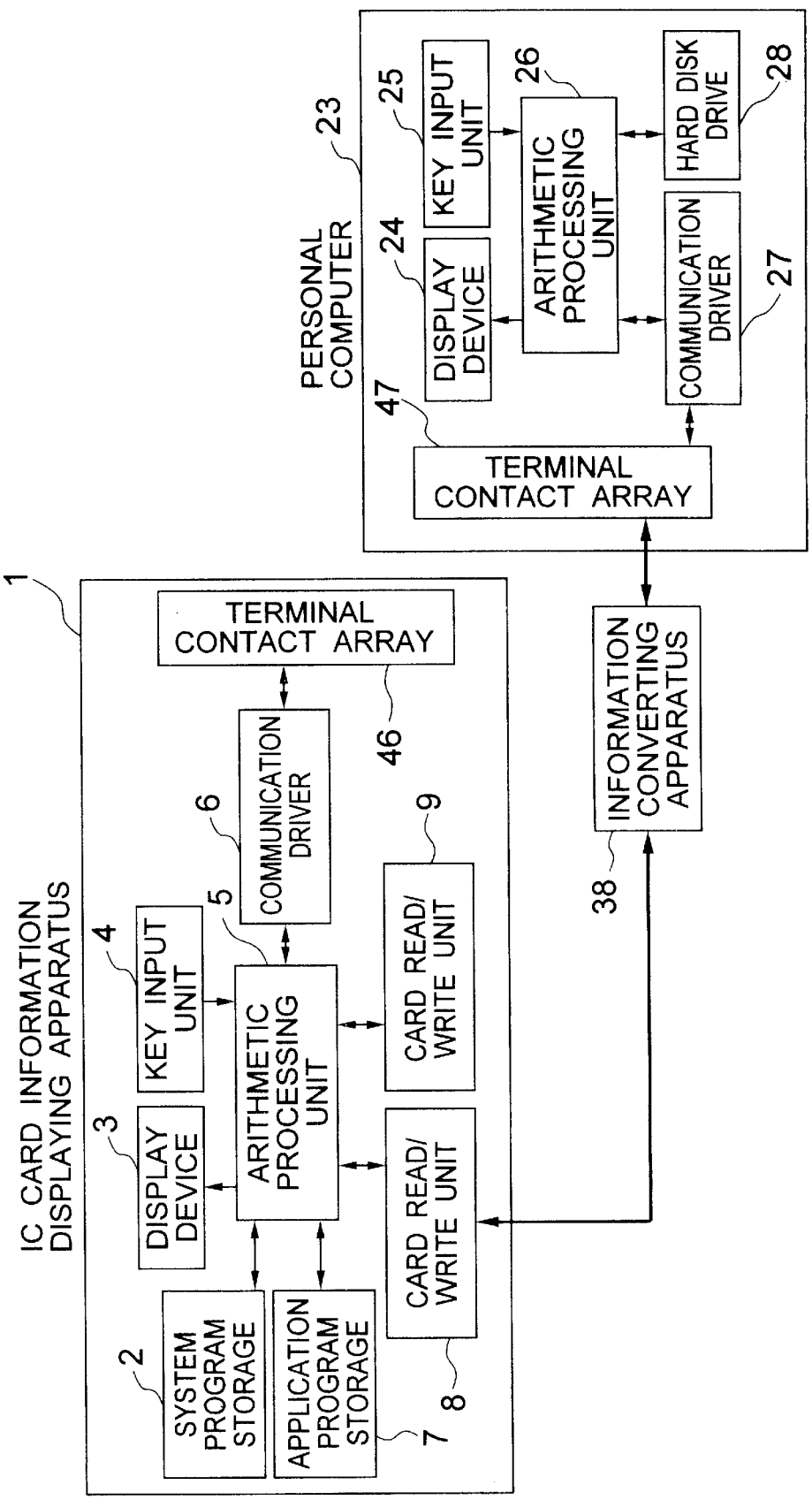
FIG. 7 is a block diagram showing a system arrangement for installing a service application program in the IC card information displaying apparatus with the aid of a personal computer according to an embodiment of the present invention.

FIG. 7 is a block diagram for illustrating a system arrangement in the case where a service application program is installed from the personal computer 23 through the medium of the IC card read/write unit 8 or 9 of the IC card information displaying apparatus 1. In the instant case, an information converting apparatus 38 is employed.

In the case of the arrangement now under consideration (shown in FIG. 7), the signals appearing at the terminal contact array 47 of the personal computer 23 are discrete signals, i.e., send signal and receive signal. On the other hand, in the IC card read/write unit 8 or 9, the send signal and the receive signal are handled as one signal. To this end, the information converting apparatus 38 for converting or synthesizing the send signal and the receive signal into one signal is connected to the terminal contact array 47 of the personal computer 23. In this case, it is presumed that the interface signals transferred between the personal computer 23 and the information converting apparatus 38 is composed of, for example, a data signal, a reset signal and a clock signal.

Intrinsically, the communication or transfer rate at which the IC card is read or written through the IC card read/write unit 8 or 9 in the start/stop synchronization is e.g. 9.6 kbps when the microcomputer clock frequency is 3.58 MHz. As the communication protocol to this end, the rules stipulated in the ISO (International Organization for Standardization)-7816 may be adopted. On the other hand, when the service application is installed by way of the IC card read/write unit 8 or 9, both the start/stop synchronization and the clock synchronization can be employed. Thus, when the clock synchronization is employed, the communication rate can be increased up to e.g. 900 bps. In that case, the communication protocol may be determined appropriately.

Figure 23:
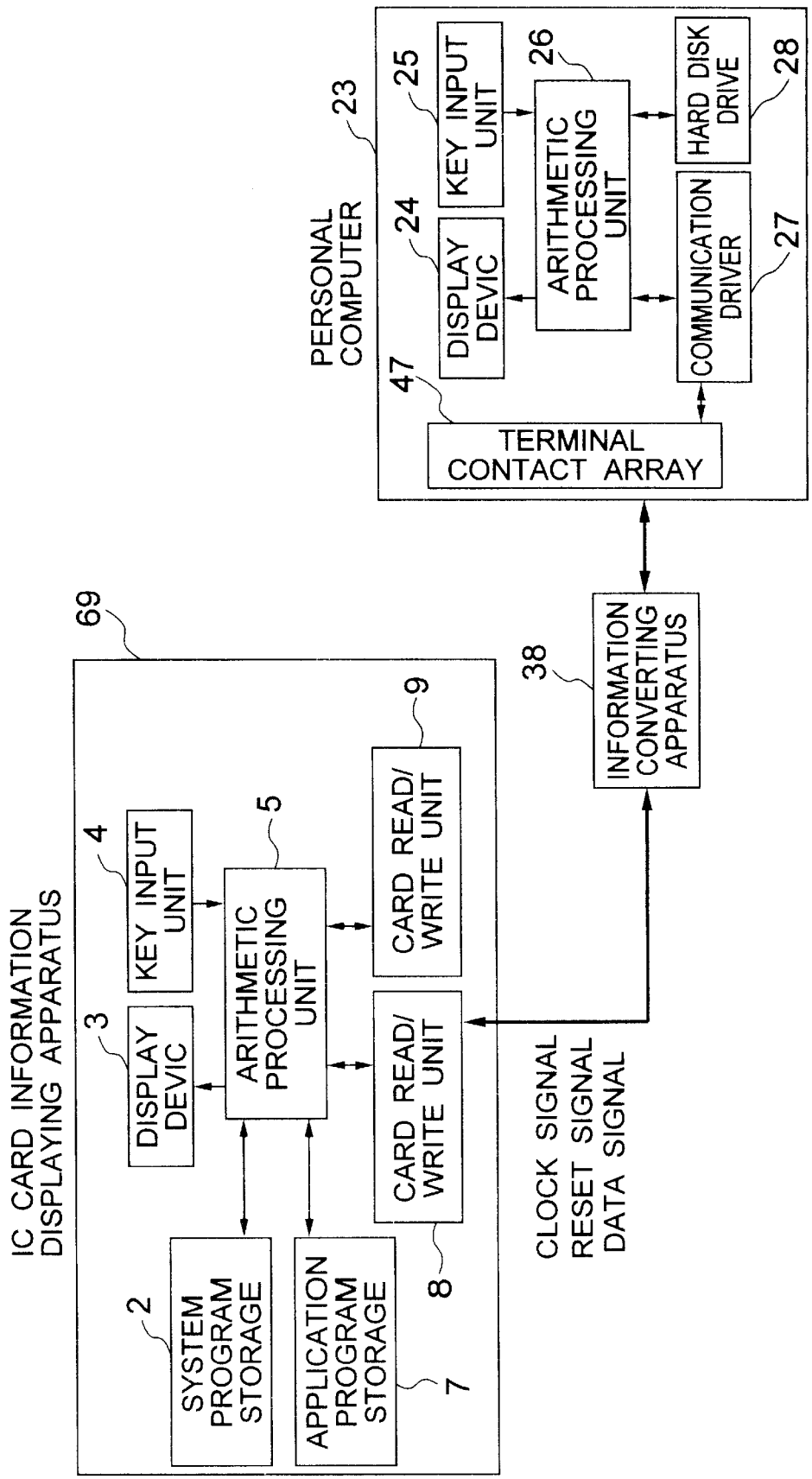
FIG. 23 is a block diagram showing a system arrangement according to an embodiment of the present invention which corresponds to that shown in FIG. 7 except that a communication driver and a terminal contact array for external connection are spared.

Parenthetically, according to the provision of the ISO-7816 Standards, the fourth and eighth terminal contacts are reserved for use in the future. Accordingly, external electric power supply for the IC card information displaying apparatus 1 can be realized by using these terminal contacts. Besides, the IC card read/write unit is indispensable for the IC card information displaying apparatus 1. Accordingly, when the service application program can be installed or registered by using the IC card read/write unit, it is then unnecessary to provide the terminal contact array and the communication driver for the IC card information displaying apparatus 1. This in turn means that the IC card information displaying apparatus 1 can be manufactured at lower cost. More specifically, the IC card information displaying apparatus 1 can be implemented in such a structure in which neither the terminal contact array nor the communication driver is provided, as is shown in FIG. 23.

In the case of the system configuration shown exemplarily in FIG. 7, the information converting apparatus 38 is provided externally of the personal computer 23 and adapted to be connected to the personal computer 23. However, it goes without saying that the information converting apparatus 38 may be built in the personal computer 23.

Figure 19:
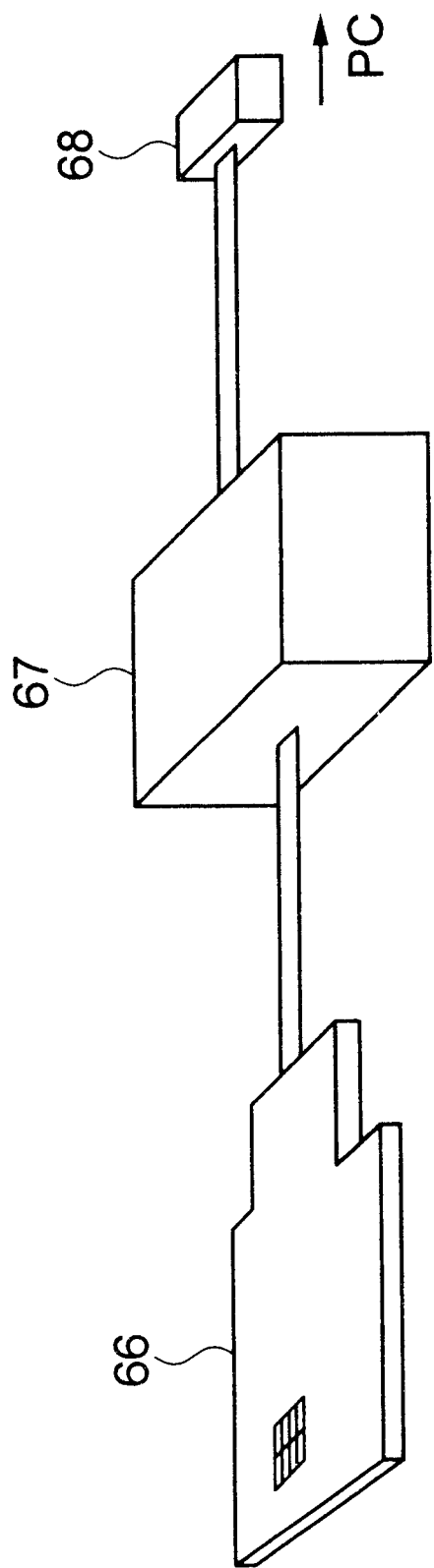
FIG. 19 is a view showing an outer appearance of an information converting apparatus according to an embodiment of the invention.

FIG. 19 shows an outer appearance of the information converting apparatus 38. In this case, it is presumed that the information converting apparatus 38 is provided externally of the personal computer 23. As can be seen, the information converting apparatus 38 is comprised of an information converting circuit 67 for converting multiplexedly the send signal and the receive signal into one signal and a connector unit 66 which is implemented in the form of an IC card. In FIG. 19, reference numeral 68 denotes an RS-232C connector adapted to be connected to an RS-232C terminal array. The shape and the contact or pin positions of the connector unit 66 conform to the ISO-7816. Parenthetically, in case the information converting apparatus 38 is to be built in the personal computer 23, the information converting circuit 67 may be built in the personal computer with only the connector unit 66 being provided externally. Furthermore, by implementing the RS-232C connector unit 68 in the shape corresponding to that of the IC card read/write unit, it is then possible to alter the number of contacts as well as the shape of the IC card.

Figure 8:
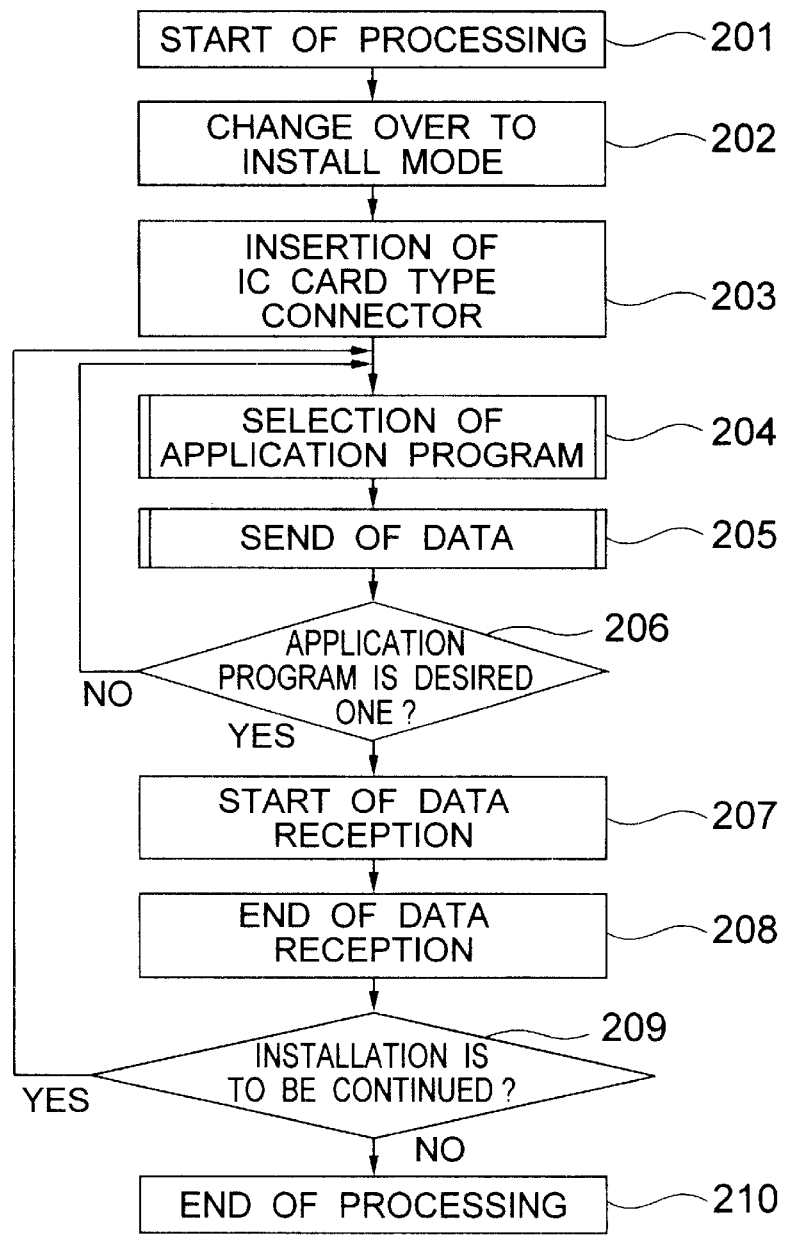
FIG. 8 is a flow chart for illustrating a flow of processings involved in installing a service application program with the system arrangement shown in FIG. 7.
Figure 22:
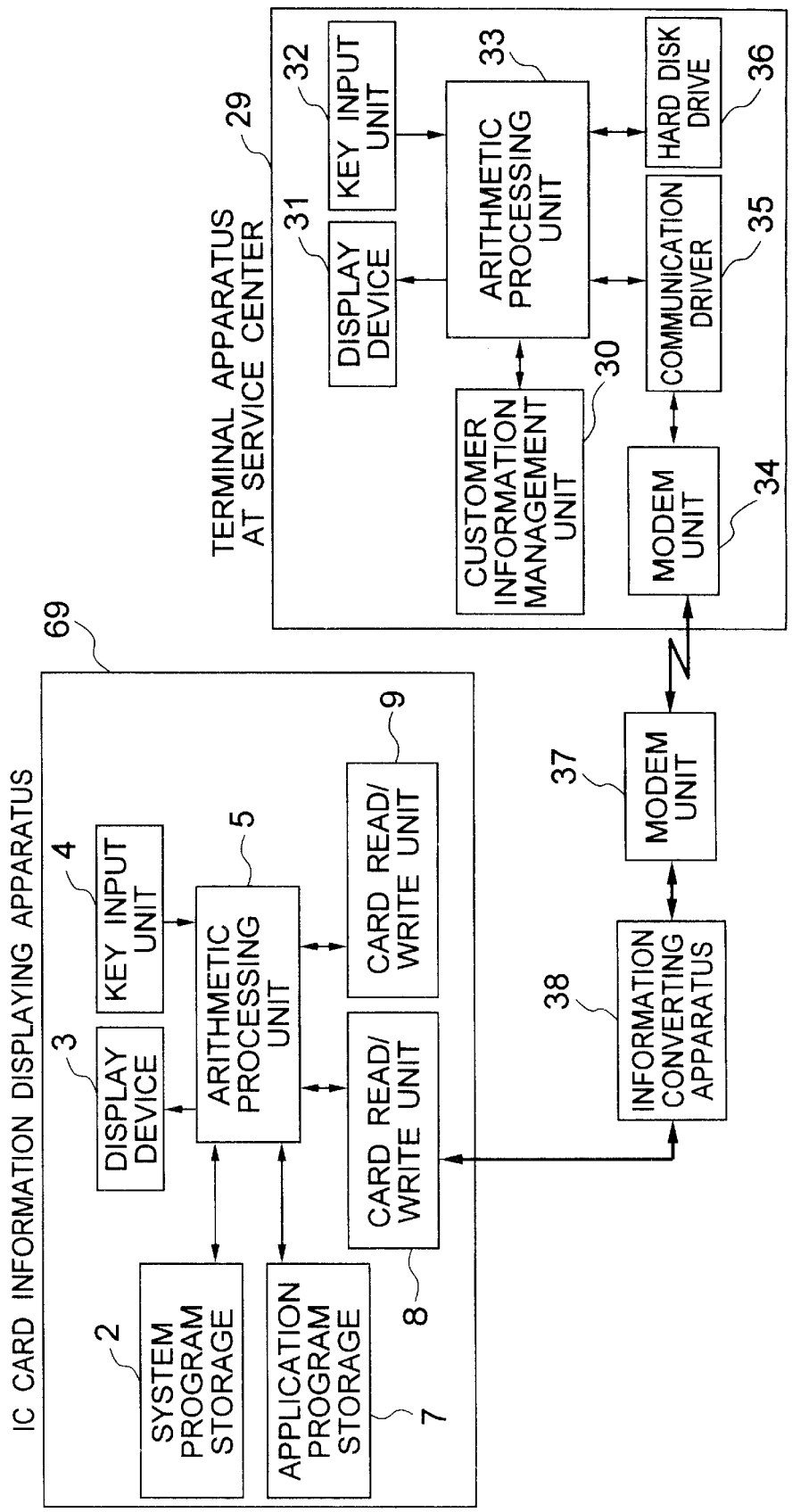
FIG. 22 is a block diagram showing a system arrangement for transferring service application list information to the IC card information displaying apparatus through the medium of a modem according to an embodiment of the present invention.

FIG. 8 is a flow chart for illustrating a processing procedure for installing a service application program in the arrangement described above by reference to FIG. 7. The processing procedure illustrated in FIG. 8 is substantially similar to that described previously by reference to FIG. 4 except for only the difference in that the step 103 shown in FIG. 4 is replaced by a step S203 in which after changeover to the mode for installing the application program, the IC card type connector is connected to the IC card information displaying apparatus 1 for thereby establishing the interconnection between the personal computer 23 and the IC card information displaying apparatus 1 by way of the information converting apparatus 38. FIG. 22 shows a system arrangement for installing a service application program via the IC card read/write unit 8 or 9 through similar procedure to that described hereinbefore by reference to FIG. 7. As can be seen in FIG. 22, it is possible to make access to the central service station by using the modem even when the IC card information displaying apparatus is not equipped with the communication driver.

Figure 9:
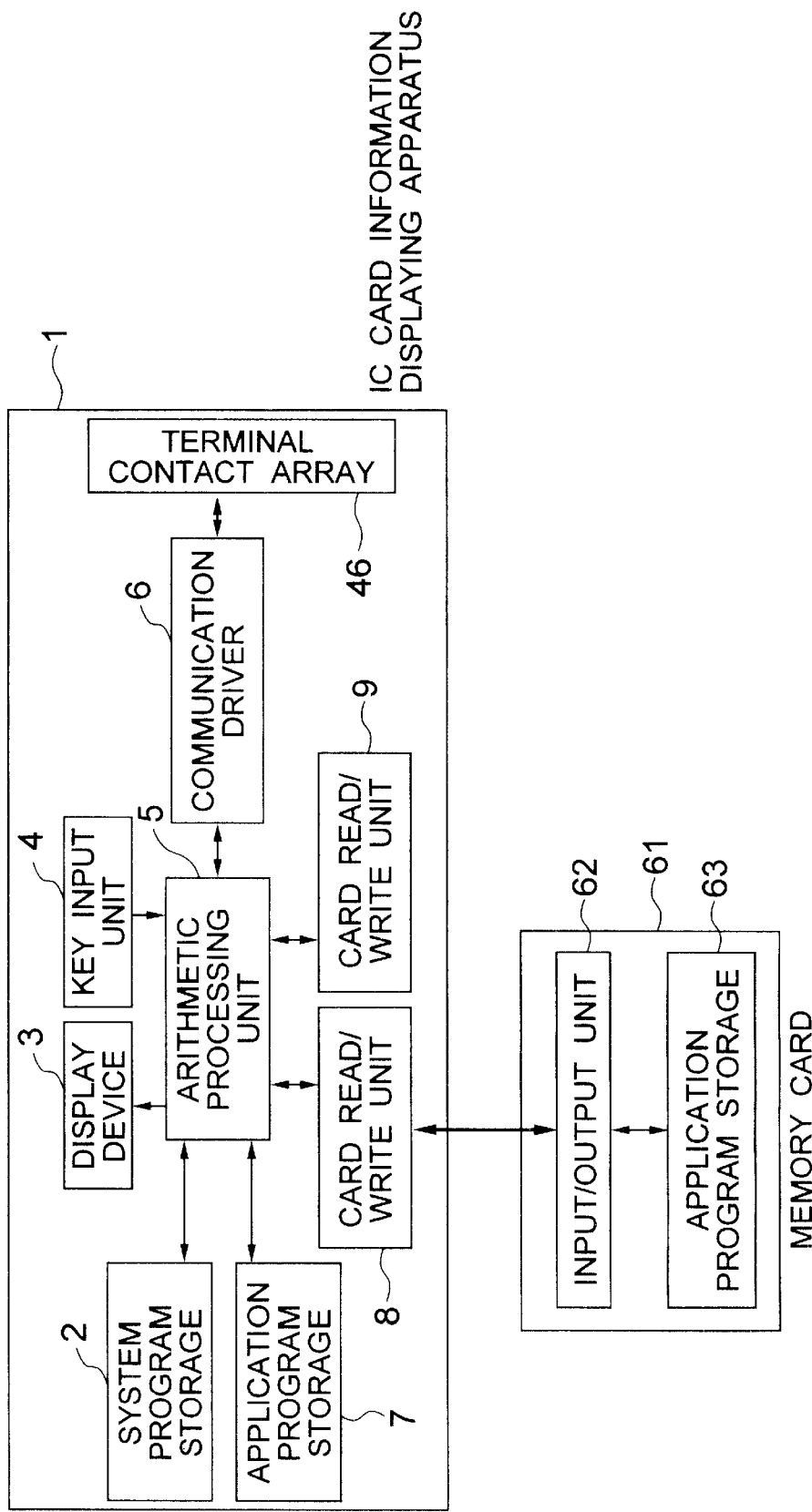
FIG. 9 is a block diagram showing a system arrangement for a service application program in the IC card information displaying apparatus by using a memory card according to an embodiment of the present invention.

FIG. 9 is a block diagram showing a system arrangement for installing a service application program by using a memory card. In the figure, reference numeral 61 denotes generally a memory card which includes an input/output unit 62 and an application program storage 63.

The memory card 61 is a device implemented in a same shape as the IC card. In the case of the example shown in FIG. 9, a service application program stored in the application program storage 63 incorporated in the memory card 61 can be installed or loaded into the IC card information displaying apparatus 1 by inserting the memory card 61 into the receiving slot provided in the displaying apparatus 1. In this case, the terminal contact array and the communication driver can be spared, as shown in FIG. 24.

Although it has been described above in conjunction with FIG. 9 that the memory card is used for installing the service application program, it goes without saying that the service application program can be once stored in the IC card equipped with the arithmetic processing unit and then installed or registered in the IC card information displaying apparatus 1. A system arrangement to this end is shown in a block diagram of FIG. 21. Referring to the figure, the IC card 64 incorporates therein a service application program storage 65 for storing a service application program to be installed in the IC card information displaying apparatus 1. In that case, there may be stored in the read/write memory 16 of the IC card 64 a corresponding card application program so that after installation or loading of the service application program into the IC card information displaying apparatus 1 from the IC card 64 inserted in the apparatus 1, the card application program mentioned above can be executed.

Figure 10:
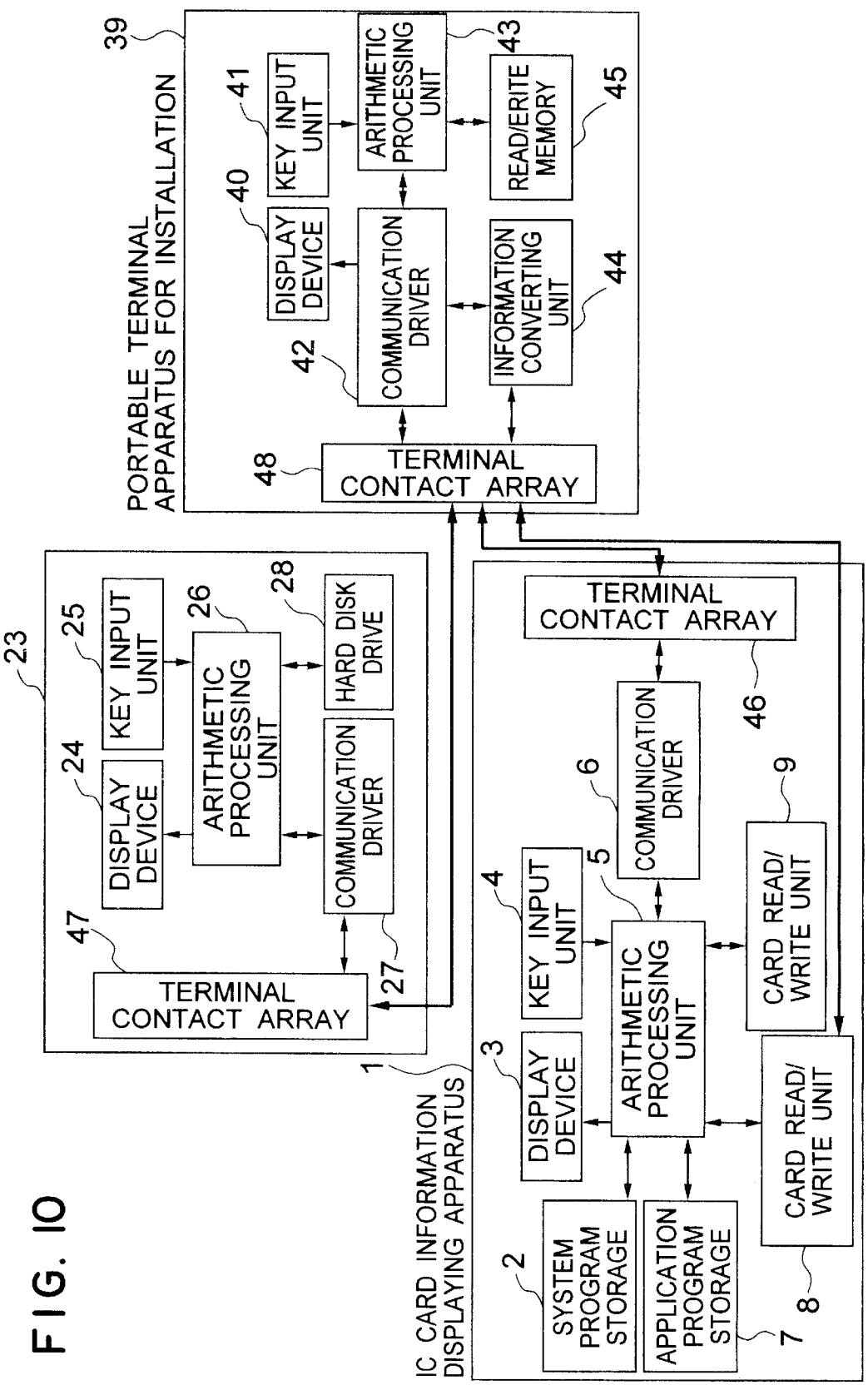
FIG. 10 is a schematic block diagram showing a system arrangement for installing a service application program in the IC card information displaying apparatus by using a portable terminal apparatus designed for installation of application program(s) according to an embodiment of the present invention.

Next, description will turn to a portable terminal apparatus designed for installation of a service application program. FIG. 10 shows in a schematic block diagram an arrangement for installing a service application program in the IC card information displaying apparatus 1 by using a portable terminal apparatus.

In FIG. 10, reference numeral 39 denotes a portable terminal apparatus which is comprised of a display device 40, a key input unit 41, a communication driver 42, an arithmetic processing unit 43, an information converting unit 44, a read/write memory 45 and a terminal contact array 48.

In the case of the arrangements described hereinbefore by reference to FIGS. 3 and 7, the personal computer 23 is connected to the IC card information displaying apparatus 1 for installing the service application program stored in the hard disk drive 28 of the personal computer 23. In this conjunction, there may arise such situation that a maintenance or service engineer has to go to a user's office for installation of the service application program. In that case, if the service engineer is forced to carry the personal computer 23, this means a heavy burden for him or her. By contrast, in the case of the arrangement shown in FIG. 10, the portable terminal apparatus 39 is employed for installation of the service application program in the IC card read/write unit. Thus, installation of the service application program can be easily realized without using the personal computer 23. Furthermore, by disposing the portable terminal apparatus 39 at an accessible place such as a storefront, the user can install the service application program by himself or herself. Since the disposition of the portable terminal apparatus is generally much inexpensive when compared with the disposition of the personal computer, the cost involved in installing the portable terminal at the storefront or the like accessible place can be reduced.

In the arrangement shown in FIG. 10, the terminal contact array 48 of the portable terminal apparatus 39 is connected to the terminal contact array 47 of the personal computer 23 in precedence to installation of a service application program in the IC card information displaying apparatus 1, to thereby load the service application program stored in the hard disk drive 28 of the personal computer 23 in the read/write memory 45 of the portable terminal apparatus 39. By installing previously plural types of service application programs in the portable terminal apparatus 39 in this manner, a given one desired by the user can be selectively loaded in the IC card information displaying apparatus 1 through manipulation of the key input unit 41 of the portable terminal apparatus 39 by the service engineer. Parenthetically, the read/write memory 45 of the portable terminal apparatus 39 may be constituted by a flush memory.

Further, because the portable terminal apparatus 39 dedicated for the installation is internally equipped with the information converting unit 44 for converting a send signal and a receive signal into a single signal, installation of the service application program can be realized through the medium of the IC card read/write unit 8 or 9 of the IC card information displaying apparatus 1, as described previously by reference to FIG. 7 or alternatively through the medium of the terminal contact array 46 of the IC card information displaying apparatus 1, as described hereinbefore by reference to FIG. 3.

In the foregoing, description has been made of the exemplary procedures for installing the service application program in the IC card information displaying apparatus.

Figure 20:
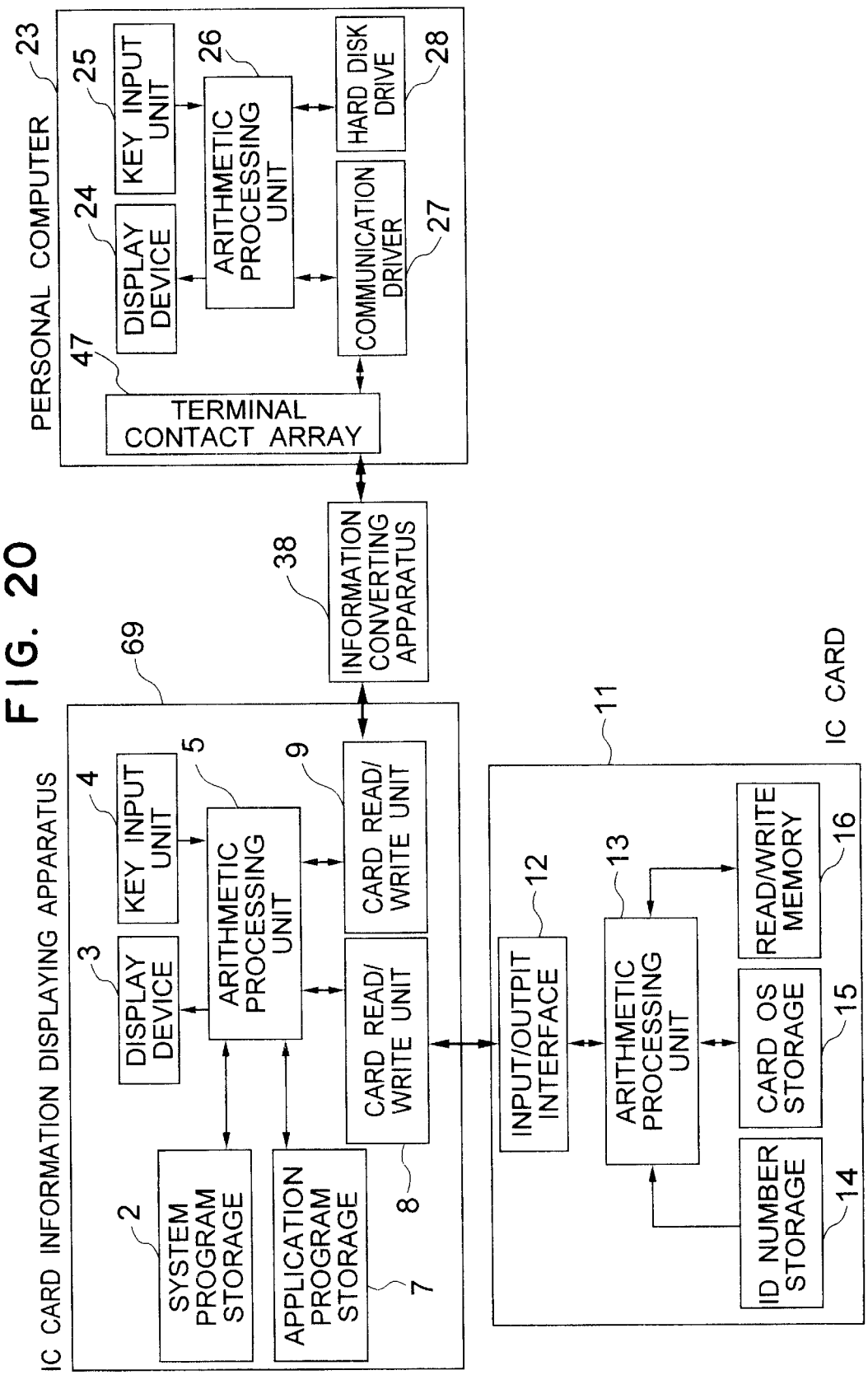
FIG. 20 is block diagram showing a system arrangement for installing a service application program and a card application program in the IC card information displaying apparatus and an IC card, respectively, by using a personal computer according to an embodiment of the invention.
Figure 21:
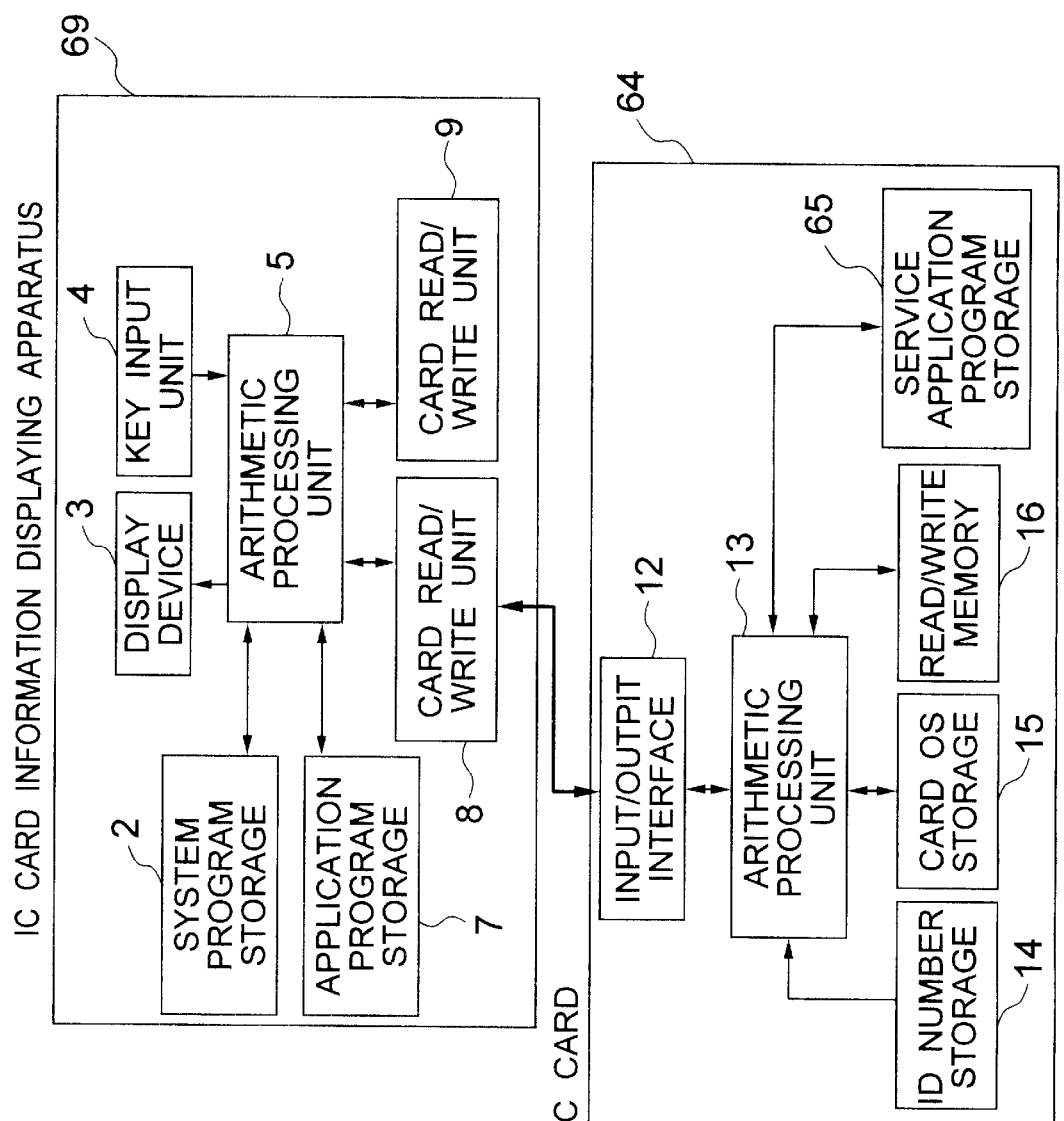
FIG. 21 is block diagram showing a system arrangement for installing a service application program in the IC card information displaying apparatus by using an IC card according to an embodiment of the invention.

At this juncture, it should further be mentioned that although the foregoing description has been made on the assumption that the service application program is installed only in the IC card information displaying apparatus 1, it is equally possible to install a card application program in the IC card 11 concurrently with installation of the service application program in the state in which the IC card 11 is connected to the IC card information displaying apparatus 1, as shown in FIG. 20. More specifically, because the IC card information displaying apparatus 1 is provided with a pair of IC card read/write units, one of the IC card read/write units can be used for receiving the user's IC card for installing a card application program while the other IC card read/write unit being used for interconnection with a personal computer for installing the service application program in the IC card information displaying apparatus.

Next, description will be made of other methods of operating or using the IC card information displaying apparatus. In the foregoing, the methods or procedures for installing display-related program(s) in the system program storage and the application program storage incorporated in the IC card information displaying apparatus are described. In that case, the program can be loaded through the medium of the IC card read/write unit of the IC card information displaying apparatus. In this conjunction, it should be mentioned that transaction of other data with a personal computer can be performed similarly through the medium of the IC card read/write unit.

By way of example, with the arrangement shown in FIG. 20, it is possible to use the IC card information displaying apparatus as an IC card reader/writer destined for connection to a personal computer. In this case, a command signal from the personal computer 23 is outputted from the terminal contact array 47 to be inputted to the IC card read/write unit 9 through the medium of the information converting apparatus 38. The inputted signal is processed by the arithmetic processing unit 5 of the IC card information displaying apparatus 69. Subsequently, data read/write operation is performed for the IC card through the IC card read/write unit 8 under the control of the arithmetic processing unit 5. In the IC card 11, the received signal is processed by the arithmetic processing unit 13 of the IC card, whereby the data of the read/write memory 16 is updated. The data as read is inputted to the IC card information displaying apparatus 69 through the IC card read/write unit 8 and at the same time sent to the personal computer 23 via the IC card read/write unit 9.

By using or operating the IC card information displaying apparatus as the IC card read/write apparatus in this manner, it is possible to read out balance remainder data, information concerning the history of transactions or like with the aid of the personal computer. In this conjunction, it should be added that the transaction of data with the personal computer can equally be carried out by using the communication driver 6 and the terminal contact array 46 of the IC card information displaying apparatus in the arrangement shown in FIG. 3, instead of using the IC card read/write unit 9 of the IC card information displaying apparatus 69 as described above.

Next, description will turn to a method of displaying titles or names of applications on the display device for allowing user to select desired one from the installed applications.

Figures 11, 12, 13:
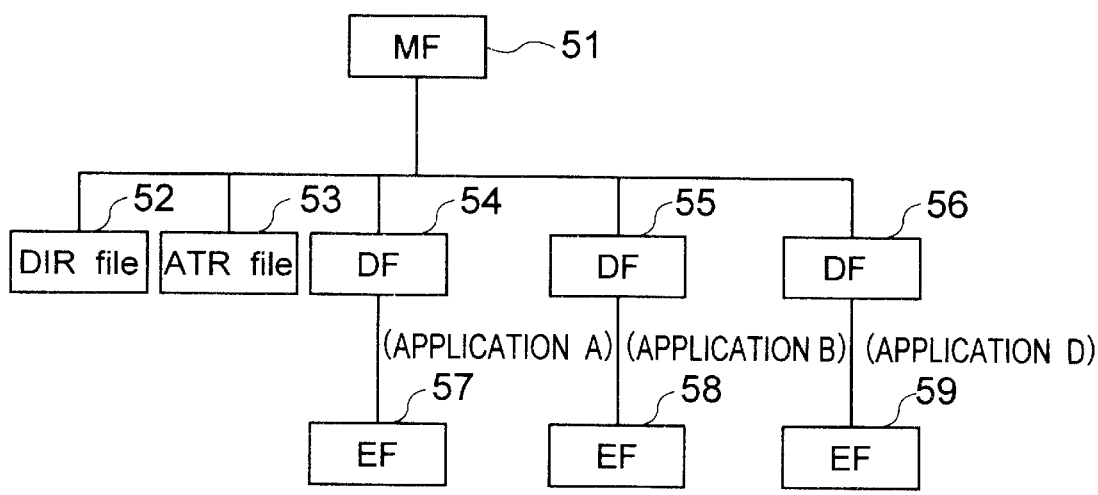
FIG. 11 is a view showing, by way of example, a list of applications employed by the IC card information displaying apparatus according to an embodiment of the present invention.
FIG. 12 is a view showing, by way of example, a file structure adopted in the IC card information displaying apparatus according to an embodiment of the invention.
FIG. 13 is a view showing, by way of example, relations between application names and application identifiers (AIDS) employed in the IC card information displaying apparatus according to an embodiment of the invention.

FIG. 11 is a view showing a list of applications displayed by the IC card information displaying apparatus 1 according to an embodiment of the invention. In the list, it is assumed that an application A relates to an electronic money card, an application B relates to a credit card, an application C relates to a point card, and an application D relates to a mileage card of an airline company. However, it should be understood that these applications are only for the purpose of illustration and thus the invention is never restricted to these applications. For displaying application data, there are required a corresponding card application program stored in the IC card and a corresponding service application program stored in IC card information displaying apparatus 1. In FIG. 11, names (titles) of the programs relating to the individual applications are shown.

At first, referring to FIG. 12, structure of data stored in the IC card will be elucidated. The IC card is implemented in conformance with the ISO-7816 Standards and composed of five types of files. They are a master file (also referred to simply as the MF), a directory (DIR) file (also referred to simply as the DIR file), an answer-to-reset file (also referred to simply as the ATR file), dedicated files (also referred to simply as the DFs) and elementary files (also referred to simply as the EFs).

When a clock signal and a reset signal are supplied to the IC card after power-on thereof, then the IC card is activated, whereby various applications contained in the IC card are made utilizable. Immediately after the activation of the IC card, a master file (MF) 51 shown in FIG. 12 is selected.

Further, upon activation of the IC card, an answer-to-reset signal (also referred to simply as the ATR signal) is sent back to the IC card information displaying apparatus 1 from the IC card. In that case, because the capacity of the master file (MF) for storing the data is limited, residual data which can not be stored in the master file (MF) is stored in the answer-to-reset file (ATR file) 53 shown in FIG. 12. Furthermore, list information of card applications stored in the IC card is stored in the directory (DIR) file 52 on a record ID basis. The card applications themselves which are indicated by the list information stored in the directory (DIR) file are stored in the elementary files (EF) 54 to 56, respectively, shown in FIG. 12. In this conjunction, data intrinsic to the individual applications may equally be stored in the elementary files (EFs) 57, 58 and 59, respectively, which are shown in FIG. 12.

Parenthetically, the record number begins with "1" and incremented one by one every time additional application is written in the IC card. Thus, when three types of applications are stored in the IC card, the record numbers "1", "2" and "3" are allocated to these applications.

For selecting the application desired by the user, the directory (DIR) file is selected by using a select file command defined in conformance with the ISO-7816, whereon transition is made from the master file (MF) to the directory file internally of the IC card. Similarly, with "read DIR record command" stipulated by the ISO-7816, the list information stored in the directory file is viewed, whereon the application identifier (hereinafter also referred to as the AID) stored in the IC card is read out. With this AID, the service application program can identify the name of the card application. In case the desired application is stored, then the application identifier or AID of the application read from the directory (DIR) file is set on the select file command, whereon transition is made to the dedicated file (DF) of the relevant application from the directory (DIR) file. Subsequently, the relevant application program is activated to thereby display application data.

By the way, the AID is represented by sixteen alphanumeric characters and defined for each of the applications, as can be seen from illustrative examples shown in FIG. 13. The service application of the IC card information displaying apparatus discriminates the AID as read out, decides the name of the application and displays the application name on the display device.

Next, referring to FIG. 14, description will be made in concrete of the application name displaying method in the IC card information displaying apparatus according to an instant embodiment of the present invention. It is assumed, by way of example only, that card application programs A, B and D are stored in the IC card and that the service application programs AA, BB and CC are stored in the IC card information displaying apparatus. It is further presumed that the applications A, B and D are stored, respectively, in the dedicated files (DFs) 54, 55 and 56 shown in FIG. 12.

As the methods of displaying the application name on the display device 3 of the IC card information displaying apparatus 1, there can be conceived four types of methods (1), (2), (3) and (4), which will be elucidated below.

(1) According to a first method, names of applications for which coincidence is found between the card applications and the service applications are displayed. In the case of the example illustrated in FIG. 14, the applications A and B are displayed. In the case of the example illustrated in FIG. 14, the cursor row displayed in inversed color or black lies on the application A. Accordingly, when the user pushes the enter key in this state, the application A is selected and executed. On the other hand, when the cursor row is moved to the position of the application B through user's manipulation of the scroll key and then the enter key is pushed, the application B is selected to be executed.

(2) According to a second method, names of applications stored in the IC card information displaying apparatus are displayed. In this case, the application A and the application B can be selected by the user through similar procedure as that described above. However, since the card application program relating to the application C is not stored in the IC card, the user can not select this application C for displaying data thereof.

(3) According to a third method, names of applications stored in the IC card are displayed. In this case, the application A and the application B can be selected by the user. However, since the service application program relating to the application D is not stored in the IC card information displaying apparatus, the user can not select this application D through similar procedure as that described above for displaying data thereof.

(4) Finally, a fourth method is directed to display of the names of all the applications stored in the IC card or the IC card information displaying apparatus. In this case, the user can not select the programs for the applications C and D.

As will be appreciated from the foregoing, in order to display desired application data by the IC card information displaying apparatus 1, the relevant application program has to be stored in the IC card and the IC card information displaying apparatus, respectively. In the case of the method (1) mentioned above, any one of the applications displayed on the display device can be selected by the user. However, there exists such application (i.e., application D in the case of the illustrated example) which can not be displayed notwithstanding it is stored in the IC card. Consequently, the user may be somewhat puzzled as to why the application can not be selected. This sort of situation may occur with not a little probability when the user operates other user's IC card information displaying apparatus. The method (2) mentioned above may suffer similar trouble.

Parenthetically, in the case of the method (2) mentioned above, data of the application C can not be displayed nevertheless user's selection because no relevant card application is stored in the IC card. Such being the circumstances, it is conceived to affix some symbol e.g. asterisk, to the name or title of the application (i.e., application C in the case of the illustrated example) which can not be displayed, to thereby distinguish the display-susceptible applications from those which can not be displayed.

On the other hand, in the case of the method (3), the names of the applications A and B can be displayed because the AIDs thereof can be discriminatively recognized by the relevant service application programs. However, for the application D, there exists no relevant service application program. Consequently, the name of the application D can not be decided by the IC card information displaying apparatus on the basis of the AIDs read out.

In the above-mentioned case, it is certainly possible to display intactly the AID (e.g. ABCD444444444444) as read out in place of displaying the name "application D". However, with only the AID, the user can not identify discriminatively the relevant application, incurring inconvenience for the user.

Figure 15:
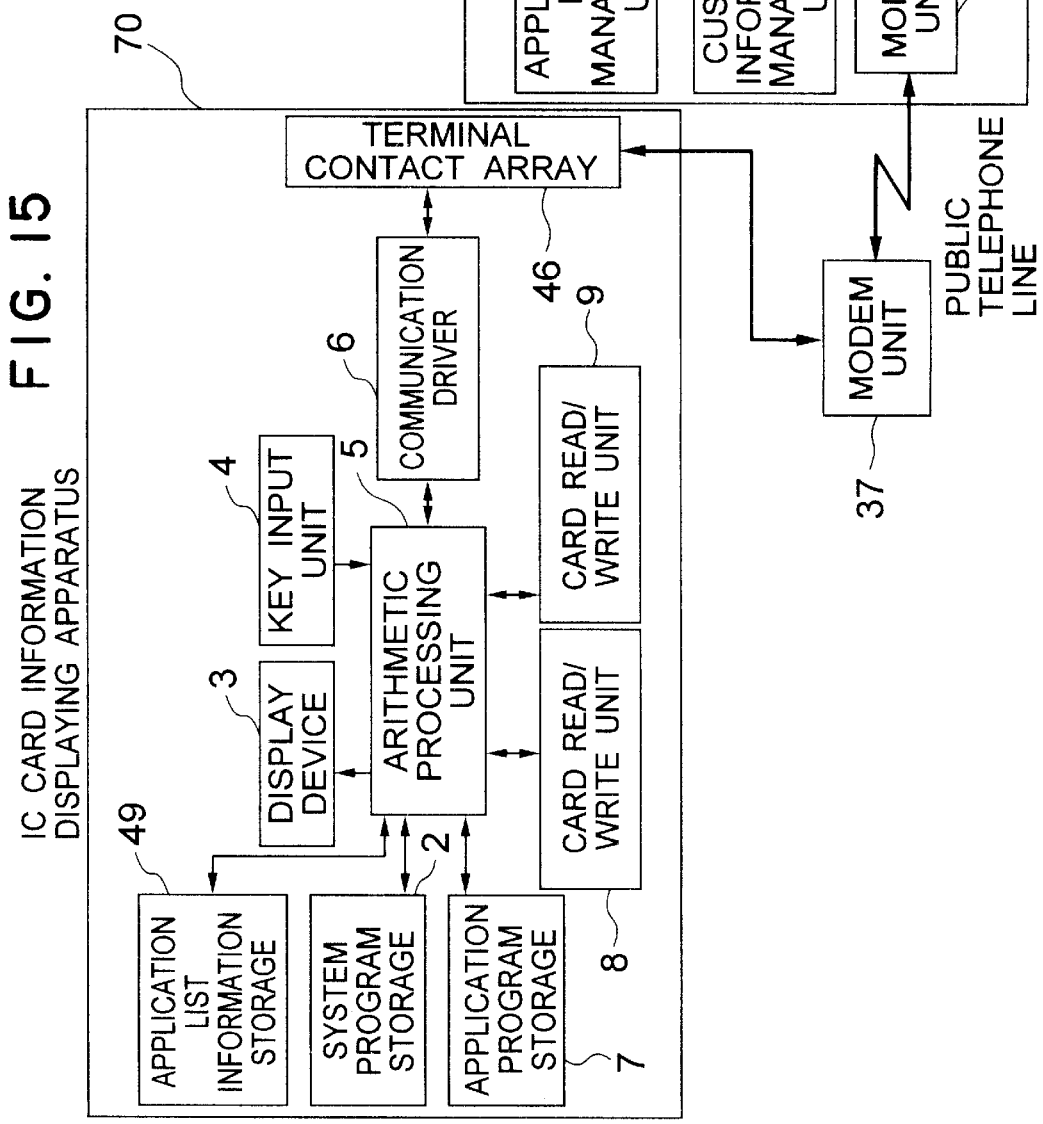
FIG. 15 is a block diagram showing a system arrangement for transferring service application list information to an IC card information displaying apparatus through the medium of a modem unit according to an embodiment of the present invention.

Under the circumstances, it is preferred to provide the IC card information displaying apparatus 1 with an application list information storage 49, as shown in FIG. 15, for thereby storing a correspondence table such as illustrated in FIG. 13 in the application list information storage 49 to thereby enable the name of application to be decided for display on the basis of the application identifiers or AIDs read from the correspondence table regardless of absence of the relevant service application program. In that case, in the application list information storage 49, the correspondence relations or correspondence table for all the applications available at that time should preferably be recorded or stored, and the correspondence table should be periodically down-loaded from an application list information management unit 50 of the terminal apparatus 29 installed in the central service station for updating constantly the table data to the latest one so that even the application data registered newly in the IC card can be coped with. Connection with the modem is possible by using the terminal contact array of the IC card information displaying apparatus. However, such connection can be realized through the medium of the IC card read/write unit of the IC card information displaying apparatus, as can be seen in FIG. 15. Further, it should be added that the application list information storage 49 can be stored in the IC card as well.

Figure 16:
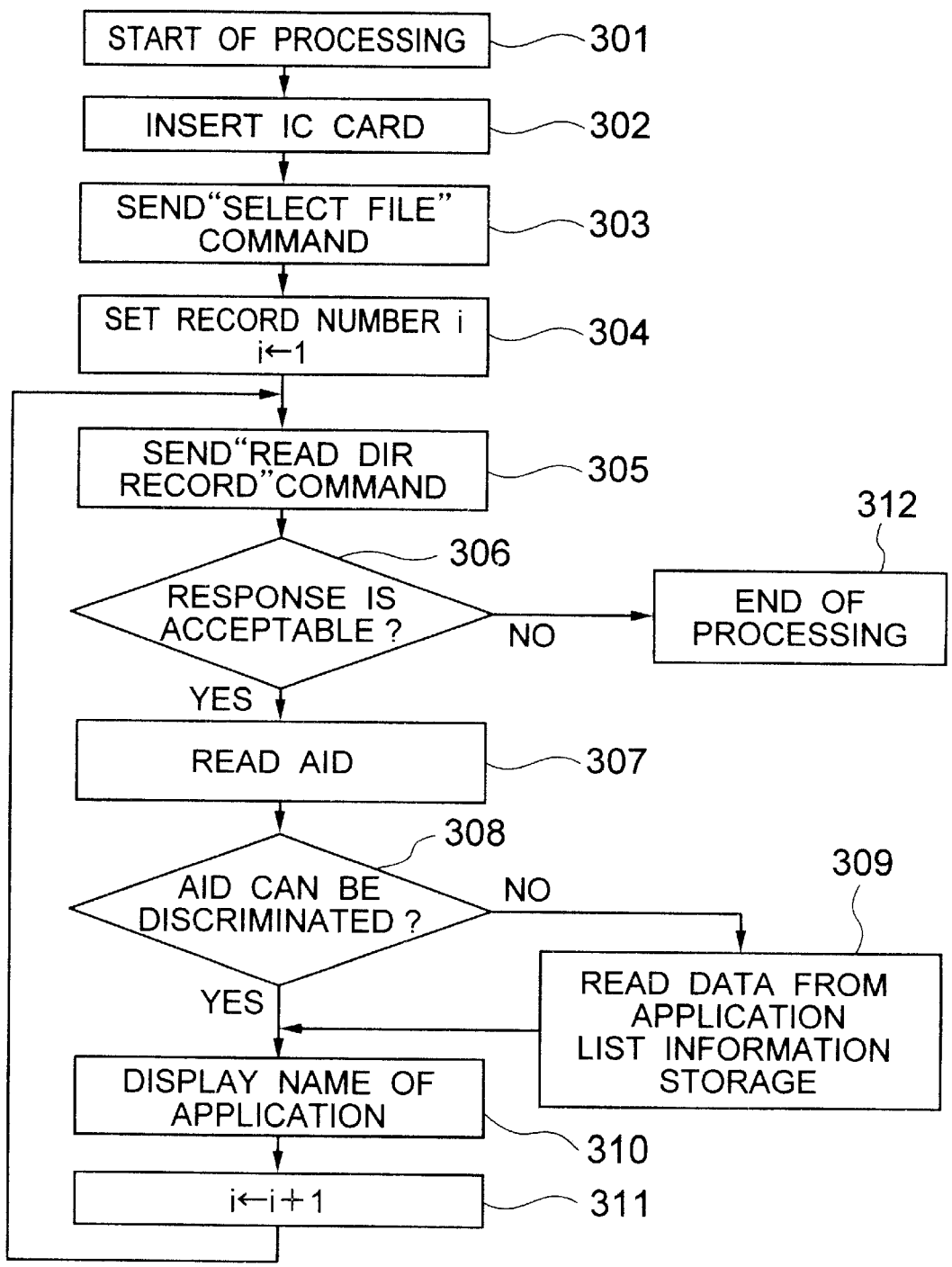
FIG. 16 is a flow chart for illustrating an exemplary processing procedure for deciding application names for display on the basis of the application identifiers in the system arrangement shown in FIG. 15.

FIG. 16 is a flow chart illustrating an exemplary processing procedure for deciding the application name for displaying the same on the basis of the AIDs mentioned above. When the user inserts an IC card after power-on of the IC card information displaying apparatus 1 (steps 301 and 302), the IC card information displaying apparatus sends out a "select file" command, which brings about transition to the directory (DIR) file from the master file (MF) (step 303). In the directory file, the record number "1" is first set (step 304), and a "read DIR record" command is sent out (step 305). Subsequently, when the IC card information displaying apparatus receives normally response from the IC card (step 306), the AID is read out from the directory file corresponding to the record ID number "1" (step 307).

When the service application program is capable of identifying discriminatively the AID (step 308), the application name is displayed on the display device 3 (step 310). On the contrary, unless the AID can be discerned (step 308), data stored in the application list information storage 49 of the IC card information displaying apparatus are read out (step 309), for deciding the name of the application to thereby display the application name on the display device 3 (step 310).

Subsequently, the record ID number is incremented by one (step 311), whereon similar processing is performed. Parenthetically, when the response to the read DIR record command sent out indicates error (step 306), this means that any further card application does not exist in the IC card. Thus, the processing concerning the display of the application names comes to an end (step 312).

In the above, the case where the application name is identified discriminatively by using the AID has been elucidated. However, in addition to the methods described above, the application name may be identified by recording directly the application name in the IC card. In that case, all the application names recorded in the IC card can be read out in a uniformized manner by recording the application names in a common memory area in the IC card in a common form.

By way of example, by recording the application names in the directory file and the answer-to-reset (ATR) file with ASCII code, the IC card information displaying apparatus can easily be read out all the application names contained in the IC card. Further, by selecting a given application with the above-mentioned "select file" command, the application names may also be recorded in the response signal issued from the IC card upon transition from the directory (DIR) file to the relevant destined file. Besides, the application names can also be recorded in the answer-to-reset (ATR) file mentioned previously.

Now, referring to FIG. 17, an exemplary method of storing the application names in the directory file will be described. When the IC card information displaying apparatus issues to the IC card a "read DIR record" command shown in FIG. 17A, the IC card sends to the IC card information displaying apparatus a "read DIR record" response data having a length of x2 bytes, as shown in FIG. 17B. Thereafter, status information of two bytes indicating whether the response data is normal or abnormal, as shown in FIG. 17C, is sent out. The command and the response data are standardized in conformance with ISO-7816, wherein the record ID number of the application which is to be read out from the directory file is placed at "x1".

At this juncture, it should be mentioned that the structure of the response data also conforms to the ISO-7816 Standards. More specifically, the response data is composed of three information, i.e., data discriminating information (Tag) of one byte, which is succeeded by one byte of information indicating length of record data (Length) and record data information (Record) designated by the information "Length". This structure of the response data will hereinafter be referred to as the TLV structure.

The response data of each application begin with the tag "Tag" of "61", which is followed by the data "Length" to which a value resulting from subtraction from the response data length (x2 bytes) is set. In succession, the AID is designated by the tag "Tag" of "4F". Incidentally, the other information may be stored with the TLV structure for storing the application information in more detail.

Subsequently, the application name is saved in the directory file. In this conjunction, it is assumed that the application name is stored with the TLV structure, beginning with "50". In that case, the application name may be stored with the ASCII code so that character information can be displayed intactly with the ASCII code, which is advantageous in that various application names can be read out in the standardized or uniformized manner.

Although it has been described that the application names are saved or stored in the directory (DIR) file, the application name may also be saved in the answer-to-reset (ATR) file through a similar procedure. In that case, data acquisition can be realized with a "read binary" command and response which conform to the ISO-7816 Standards.

By recording the data in the common memory area of the IC card with the common form, as described above, the IC card information displaying apparatus can read the application names stored in the IC cards in the uniformized or standardized manner, which is advantageous in that at least the application names stored in the IC cards can be displayed even when the relevant service application programs do not exist in the IC card information displaying apparatus.

However, in the above-mentioned case, the user can not select the application itself. Accordingly, it is preferred to display, e.g. an asterisk mark in juxtaposition to the name of such application which is displayed, to thereby distinguish the unselectable applications from the other selectable applications upon displaying thereof.

In the foregoing, description has been made on the displaying methods or procedures for displaying the application names with the IC card information displaying apparatus 1. Finally, description will be directed to the order or sequence in which a plurality of applications are displayed. When a plurality of application names are to be displayed on the display device 3, there can be conceived displaying methods mentioned below.

(1) Method of displaying the application names in a sequence which conforms to that of the record ID numbers stored in the IC card.

(2) Method of displaying the application names in a sequence of addresses of the memory of the IC card information displaying apparatus at which service applications are stored.

(3) Method of displaying the application names in an alphabetic order.

(4) Method of displaying the application names in a sequence based on the use frequency of the relevant applications.

(5) Method of displaying the application names in a sequence of dates at which the relevant applications was installed.

(6) Method of displaying the application names in a sequence determined by the user.

For carrying out the method (4) mentioned above, an application use frequency record storage 60 should preferably be incorporated in the IC card information displaying apparatus 1, as shown in FIG. 18, for counting the number of times the processing is performed on the applications. In other words, the count value stored in the application use frequency record storage 60 and indicating the use frequency of a given one of the applications is incremented upon every execution of processing on that given application. Upon display of the application name list, the applications are arrayed in descending order in conformance with the use frequencies. Similarly, the method (5) can easily be realized by providing the IC card information displaying apparatus with a storage for storing the dates of installation of the applications. For realizing the method (6), a storage for storing the values set by the user may be incorporated in the IC card information displaying apparatus. Incidentally, the storages mentioned above may be incorporated in the IC card in place of the IC card information displaying apparatus.

At this juncture, it should further be added that the names of the applications need not always normal or formal names. It is sufficient that the user can recognize discriminately the application from the information given by the name or title thereof. Accordingly, abbreviations of application names, information other than character information such as graphic information indicative of applications or the like may be adopted as the application names. By way of example, let's suppose an application whose formal name is "XYZ camera point". In that case, abbreviation such as "XYZ", "XYZ point", "XYZ camera", "XYZ point" or the like may be displayed instead of the formal name "XYZ camera point" because the user can recognize distinctly the relevant application from the abbreviation. By the way, it is conceivable that the number of the characters for display of the application name is limited by the size of the display device of the IC card information displaying apparatus. In that case, display of the application name in abbreviation is preferred. Furthermore, the user can recognize the application from the graphic information such as icons representing camera and others as well as logo marks. Thus, the display of the application name is never restricted to the character information.

The foregoing description of the preferred or exemplary embodiments of the invention has been made on the assumption that the contact type IC card designed for transferring the signal through the electric contacts is employed. However, the present invention is never restricted to the use of such contact type IC card. The invention can equally be applied to the system where the card of contactless type is used. It should further be mentioned that IC card itself is not restricted to any specific shapes inclusive of the card-like shape. In other words, with the phrase "IC card", it is intended to encompass those of other shapes such as thick sheets, bar-like sheets and others so far as the teachings of the present invention disclosed herein can be realized.

Furthermore, although the present invention has been described in conjunction with the applications relating to the monetary amount information such as electronic money, premium point or the like by reference to FIGS. 1 to 25, it should be appreciated that the teachings of the present invention can be equally applied to other applications such as schedule manage application, health insurance card manage application, game application and the like.

As will be now be appreciated, according to the teachings of the present invention, there has been provided the IC card system in which a plurality of application data such as premium point information and the like are stored in a single IC card together with electronic money information, wherein application data required by the user can be selectively displayed by the IC card information displaying apparatus by selecting the application data through key manipulation.

At this juncture, it is noted that when application data is newly added to the IC card, the added application data can not be viewed by the same IC card information displaying apparatus unless a corresponding display control service application program is additionally loaded in the IC card information displaying apparatus as well. To cope with this sort of situation, it is taught by the present invention to install the service application program from the personal computer or the modem through the medium of the communication driver such as RS-232C. Thus, the service application program can be easily added. In this way, addition of new application data in the IC card can be realized without any appreciable difficulty, whereby general-purposiveness and conveniency of the IC card system can be enhanced significantly.

Furthermore, in the IC card system according to the invention, installation of the service application programs and transaction or communication with personal computers can be carried out through the contacts of the IC card. Thus, there arises no necessity of providing the IC card information displaying apparatus with any specific terminal contact array and the communication driver, which in turn means that the IC card information displaying apparatus can be implemented at lower cost.

In conjunction with selection of the application by the user, such situation may arise that the type of the application data stored in the IC card do not coincide with the type of the service application program stored in the IC card information displaying apparatus. Thus, a unitary or consolidative method of displaying the application names is realized. To this end, the present invention teaches such arrangement which enables the user to select the display of only the names of the applications which conform with the application data stored in the IC card or the display of the names of all applications stored in the IC card or in the IC card information displaying apparatus, whereby conveniency for the user can be considerably enhanced.

It is also noted that when all the names of the applications stored in the IC card are to be displayed, the name of the application for the data for which service application program is not stored in the IC card information displaying apparatus can not be decided on the basis of the AIDs read out from the IC card. In this conjunction, the present invention teaches to store previously the name list for all the possible applications used in every field in the IC card information displaying apparatus or the IC card. Thus, even for the service application program which is not stored in the IC card information displaying apparatus or the IC card, the name of that service application program can be displayed on the basis of the AID information read out from the IC card. The IC card system according to the invention can provide enhanced conveniency for the user.

Additionally, according to another procedure taught by the present invention, the application names can be stored in a common form in a common area of the memory incorporated in the IC card. By virtue of this feature, the application names can be displayed at any time, ensuring thus enhanced conveniency for the user. To this end, ASCII code characters can be stored in e.g. the directory file.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. An IC card information processing apparatus for processing information stored in an IC card, wherein said IC card includes an input/output unit which inputs/outputs information, storage which stores information concerning a plurality of applications, and an arithmetic processor which process the information concerning said applications, said IC card information processing apparatus comprising:
service application program storage capable of storing a plurality of service application programs which correspond to said applications, respectively;
an IC card reader/writer which reads/writes information through the medium of said input/output unit of said IC card; and
an apparatus-incorporated arithmetic processor incorporated in said IC card information processing apparatus which processes the information concerning said applications stored in said IC card by using said service application programs corresponding to said applications, respectively, while exchanging the information with said arithmetic processor of said IC card through the medium of said IC card reader/writer,
wherein said IC card reader/writer is so designed as to enable said service application program to be inputted to said IC card information processing apparatus, and wherein said apparatus-incorporated arithmetic processor is so designed as to control storage of said service application program inputted through said IC card reader/writer in said service application program storage.

2. An IC card information processing apparatus according to claim 1,
wherein the information concerning the application stored in the storage of said IC card includes a card application program for enabling said application to be operative in said IC card, and application data processed by said card application program.

3. An IC card information processing apparatus according to claim 2,
wherein said IC card information processing apparatus is so designed as to be capable of performing read/write operation on application data stored in said IC card when a service application program corresponding to a card application contained in said IC card and relevant to said application data is stored in said application program storage of said IC card information processing apparatus.

4. An IC card information processing apparatus according to claim 1,
wherein the service application program inputted through said IC card reader/writer is information which is outputted from an external information processing terminal apparatus by way of information convertor designed for converting signal type.

5. An IC card information processing apparatus according to claim 1,
wherein the service application program inputted through said IC card reader/writer is information which is stored in a storage medium equipped with inputter/outputter which can be connected to said IC card reader/writer.

6. An IC card information processing apparatus according to claim 1,
wherein at least one of said plural applications is an application for commercial transaction.

7. An IC card information processing apparatus for processing information stored in an IC card, wherein said IC card includes an input/output unit which inputs/outputs information, storage which stores information concerning a plurality of applications, and an arithmetic processor which processes the information concerning said applications, said IC card information processing apparatus comprising:

service application program storage which stores a plurality of service application programs which correspond to said applications, respectively;

an IC card reader/writer which reads information concerning the applications stored in said IC card through the medium of said input/output unit of said IC card;

a display which displays names of applications used in said IC card; and an apparatus-incorporated arithmetic processor incorporated in said IC card information processing apparatus for performing such control that when a service application program corresponding to an application is not stored in said application program storage, the name of said application is displayed on said display on the basis of application identifying information contained in the information concerning the application as fetched through said IC card reader/writer.

8. An IC card information processing apparatus according to claim 7, wherein said information concerning the application stored in said storage of said IC card includes a card application program for enabling said application to be operative in said IC card, and application data processed by said card application program.

9. An IC card information processing apparatus according to claim 8, wherein said IC card information processing apparatus is designed to be capable of performing read/write operation on application data stored in said IC card when a service application program corresponding to a card application contained in said IC card and relevant to said application data is stored in said application program storage.

10. An IC card information processing apparatus according to claim 7, said IC card information processing apparatus further comprising:

application name storage which stores information concerning correspondences between application identifying information and names of the applications read through said IC card reader/writer;

wherein said apparatus-incorporated arithmetic processor is designed to perform such control that the names of the applications are displayed on said display on the basis of information stored in said application name storage.

11. An IC card information processing apparatus according to claim 10, wherein information concerning correspondences between the identifying information of the applications and the names of the applications stored in the IC card is inputted through said IC card reader/writer; and wherein said application name storage is designed to store said information inputted through said IC card reader/writer.

12. An IC card information processing apparatus according to claim 10, wherein said application name storage is so designed as to be capable of storing information concerning correspondences between the identifying information and the names of all the applications used in said IC card.

13. An IC card information processing apparatus according to claim 7, wherein the application identifying information read through the medium of said IC card reader/writer contains a predetermined type of information; and wherein said arithmetic processor is so designed as to perform such control that said predetermined type of information is displayed on said display.

14. An IC card information processing apparatus according to claim 13, wherein said predetermined type of information is character code information.

15. An IC card information processing apparatus according to claim 7, wherein the name of said application is represented by one selected from a group consisting of a formal name, an abridged name and graphic information indicative of said application.

16. An IC card, comprising:

first storage which stores a plurality of card application programs for enabling a plurality of applications to be operative, respectively, and a plurality of application data processed by said card application programs;

second storage which stores a plurality of information concerning names of said plural applications; and an arithmetic processor for processing the information stored in said first and second storage, respectively, wherein the information concerning the names of said plural applications stored in said second storage is stored in a common form.

17. An IC card according to claim 16, wherein said common form is realized by a predetermined character code.

18. An information converting apparatus destined for use with an IC card information processing apparatus which includes IC card reader/writer which reads/writes information from/into an IC card, said apparatus being capable of inputting/outputting information to/from said IC card information processing apparatus, said information converting apparatus comprising:

first input/output interface;

information converter connected to said input/output interface; and second input/output interface connected to said information converting, wherein said first input/output interface is designed to be connected to said IC card reader/writer, and wherein information inputted/outputted through said second input/output interface and information inputted/outputted through said first input/output interface are converted in respect to type of the information such that said information can be inputted/outputted to/from said IC card information processing apparatus through the medium of said IC card reader/writer.

19. An information converting apparatus according to claim 18, wherein said first input/output interface is provide with contacts for inputting/outputting the information, and wherein shape of a portion of said first input/output interface which is connected to said IC card reader/writer as well as positions of said contacts are compatible with an IC card conforming to ISO-7816 Standards.

20. An information converting apparatus according to claim 19,
wherein said second input/output interface is implemented in conformance with RS-232C Standards.

21. A service application program installing system, comprising:
an IC card information processing apparatus designed for use with an IC card for processing information stored in said IC card, wherein said IC card includes an input/output unit which inputs/outputs information, storage which stores information concerning a plurality of applications, and IC card arithmetic processor which processes the information concerning said applications;
an information processing terminal apparatus equipped with input/output unit which inputs/outputs information; and
an information converting apparatus for interconnecting said IC card information processing apparatus and said information processing terminal apparatus,
wherein said IC card information processing apparatus includes service application program storage which stores a plurality of service application programs corresponding to said applications, respectively, an IC card information reader/writer which reads/writes information through the medium of said input/output unit of said IC card, and an apparatus-incorporated arithmetic processor incorporated in said IC card information processing apparatus for processing the information concerning said applications stored in said IC card by using said service application programs corresponding to said applications, respectively, while exchanging the information with said arithmetic processor of said IC card through the medium of said IC card reader/writer, and
wherein said information converting apparatus includes first input/output interface, information converting connected to said input/output interface, and second input/output interface connected to said information converting,
said first input/output interface being designed to be connected to said IC card reader/writer while said second input/output interface is designed to be connected to said information processing terminal apparatus,
wherein information inputted/outputted to/from said information processing terminal apparatus and information inputted/outputted through said first input/output interface are converted in respect to type of the information, and
wherein information outputted from said information processing terminal apparatus is inputted to said IC card information processing apparatus through said IC card reader/writer as a service application program to be stored in said service application program storage.

22. A service application program installing system according to claim 21,
wherein said information processing terminal apparatus is equipped with a communication unit which receives information inputted externally.

23. A service application program installing system according to claim 21,
wherein said information processing terminal apparatus is implemented in the form of a computer.

24. An IC card information processing system including an IC card and an IC card processing apparatus for processing information stored in said IC card,
said IC card comprising:
first storage which stores a plurality of card application programs for enabling a plurality of applications to be operative, respectively, and a plurality of application data processed by said card application programs;
second storage which stores a plurality of information concerning names of said plural applications in a common form; and
an arithmetic processor which processes the information stored in said first and second storage, respectively, and
said IC card information processing apparatus comprising:
service application program storage which stores a plurality of service application programs which correspond to said applications, respectively;
IC card reader/writer which reads information concerning the applications stored in said first and second storage of said IC card through the medium of said input/output unit of said IC card;
display which displays names of applications used in said IC card; and
an apparatus-incorporated arithmetic processor incorporated in said IC card information processing apparatus for performing such control that when a service application program corresponding to an application is not stored in said application program storage, the name of said application is displayed on said display on the basis of information concerning the names of applications stored in said second storage of said IC card.

25. An IC card information processing system according to claim 24,
wherein said IC card information processing apparatus is so designed as to be capable of performing read/write operation on application data stored in said IC card when a service application program corresponding to a card application contained in said IC card and relevant to said application data is stored in said application program storage of said IC card information processing apparatus.

26. An IC card information processing system according to claim 24,
wherein the name of said application is represented by one selected from a group consisting of a formal name, an abridged name and graphic information indicative of said application.

27. An IC card information processing apparatus for processing information stored in an IC card, wherein said IC card includes input/output means for inputting/outputting information, storage means for storing information concerning a plurality of applications, and arithmetic processing means for processing the information concerning said applications,
said IC card information processing apparatus comprising:
service application program storage means capable of storing a plurality of service application programs which correspond to said applications, respectively;
IC card read/write means for reading/writing information through the medium of said input/output means of said IC card; and
apparatus-incorporated arithmetic processing means incorporated in said IC card information processing apparatus for processing the information concerning said applications stored in said IC card by using said service application programs corresponding to said applications, respectively, while exchanging the information with said arithmetic processing means of said IC card through the medium of said IC card read/write means, wherein said IC card read/write means is so designed as to enable said service application program to be inputted to said IC card information processing apparatus, and wherein said apparatus-incorporated arithmetic processing means is so designed as to control storage of said service application program inputted through said IC card read/write means in said service application program storage means.

28. An IC card information processing apparatus for processing information stored in an IC card, wherein said IC card includes input/output means for inputting/outputting information, storage means for storing information concerning a plurality of applications, and arithmetic processing means for processing the information concerning said applications, said IC card information processing apparatus comprising:

service application program storage means for storing a plurality of service application programs which correspond to said applications, respectively;

IC card read/write means for reading information concerning the applications stored in said IC card through the medium of said input/output means of said IC card;

display means for displaying names of applications used in said IC card; and apparatus-incorporated arithmetic processing means incorporated in said IC card information processing apparatus for performing such control that when a service application program corresponding to an application is not stored in said application program storage means, the name of said application is displayed on said display means on the basis of application identifying information contained in the information concerning the application as fetched through said IC card read/write means.

29. An IC card, comprising:

first storage means for storing a plurality of card application programs for enabling a plurality of applications to be operative, respectively, and a plurality of application data processed by said card application programs;

second storage means for storing a plurality of information concerning names of said plural applications; and arithmetic processing means for processing the information stored in said first and second storage means, respectively, wherein the information concerning the names of said plural applications stored in said second storage means is stored in a common form.

30. An information converting apparatus destined for use with an IC card information processing apparatus which includes IC card read/write means for reading/writing information from/into an IC card, said apparatus being capable of inputting/outputting information to/from said IC card information processing apparatus, said information converting apparatus comprising:

first input/output interface circuit means;

information converting circuit means connected to said input/output interface circuit means; and second input/output interface circuit means connected to said information converting circuit means, wherein said first input/output interface circuit means is designed to be connected to said IC card read/write means, and wherein information inputted/outputted through said second input/output interface circuit means and information inputted/outputted through said first input/output interface circuit means are converted in respect to type of the information such that said information can be inputted/outputted to/from said IC card information processing apparatus through the medium of said IC card read/write means.

31. A service application program installing system, comprising:

an IC card information processing apparatus designed for use with an IC card for processing information stored in said IC card, wherein said IC card includes input/output means for inputting/outputting information, storage means for storing information concerning a plurality of applications, and IC card arithmetic processing means for processing the information concerning said applications;

an information processing terminal apparatus equipped with input/output means for inputting/outputting information; and an information converting apparatus for interconnecting said IC card information processing apparatus and said information processing terminal apparatus, wherein said IC card information processing apparatus includes service application program storage means for storing a plurality of service application programs corresponding to said applications, respectively, IC card information read/write means for reading/writing information through the medium of said input/output means of said IC card, and apparatus-incorporated arithmetic processing means incorporated in said IC card information processing apparatus for processing the information concerning said applications stored in said IC card by using said service application programs corresponding to said applications, respectively, while exchanging the information with said arithmetic processing means of said IC card through the medium of said IC card read/write means, and wherein said information converting apparatus includes first input/output interface circuit means, information converting circuit means connected to said input/output interface circuit means, and second input/output interface circuit means connected to said information converting circuit means, said first input/output interface circuit means being designed to be connected to said IC card read/write means while said second input/output interface circuit means is designed to be connected to said information processing terminal apparatus, wherein information inputted/outputted to/from said information processing terminal apparatus and information inputted/outputted through said first input/output interface circuit means are converted in respect to type of the information, and wherein information outputted from said information processing terminal apparatus is inputted to said IC card information processing apparatus through said IC card read/write means as a service application program to be stored in said service application program storage means.

32. An IC card information processing system including an IC card and an IC card processing apparatus for processing information stored in said IC card, said IC card comprising:

first storage means for storing a plurality of card application programs for enabling a plurality of applications to be operative, respectively, and a plurality of application data processed by said card application programs;

second storage means for storing a plurality of information concerning names of said plural applications in a common form; and an arithmetic processing means for processing the information stored in said first and second storage means, respectively, and said IC card information processing apparatus comprising:

service application program storage means for storing a plurality of service application programs which correspond to said applications, respectively;

IC card read/write means for reading information concerning the applications stored in said first and second storage means of said IC card through the medium of said input/output means of said IC card;

display means for displaying names of applications used in said IC card; and an apparatus-incorporated arithmetic processing means incorporated in said IC card information processing apparatus for performing such control that when a service application program corresponding to an application is not stored in said application program storage means, the name of said application is displayed on said display means on the basis of information concerning the names of applications stored in said second storage means of said IC card.

* * * * *